(12) United States Patent
Okuda et al.

(10) Patent No.: US 7,140,962 B2
(45) Date of Patent: Nov. 28, 2006

(54) VIDEO GAME APPARATUS, IMAGE PROCESSING METHOD AND PROGRAM

(75) Inventors: Nobuya Okuda, Kobe (JP); Masayuki Ohashi, Kobe (JP); Shigenobu Matsuyama, Kobe (JP)

(73) Assignee: Konami Corporation, Tokyo (JP)

( * ) Notice: Subject to any disclaimer, the term of this patent is extended or adjusted under 35 U.S.C. 154(b) by 735 days.

(21) Appl. No.: 10/616,325

(22) Filed: Jul. 8, 2003

(65) Prior Publication Data

US 2004/0009798 A1 Jan. 15, 2004

(30) Foreign Application Priority Data

Jul. 12, 2002 (JP) ............................. 2002-204909

(51) Int. Cl.
*A63F 13/00* (2006.01)

(52) U.S. Cl. .............................. 463/2; 463/31; 463/36; 463/49

(58) Field of Classification Search .................. 463/48, 463/49, 50, 51, 1, 2, 36, 37, 38, 39
See application file for complete search history.

(56) References Cited

U.S. PATENT DOCUMENTS 6,379,249 B1    4/2002  Satsukawa et al. ........... 463/31

FOREIGN PATENT DOCUMENTS

| CN | 1420451 | 5/2003 |
|---|---|---|
| CN | 1421258 | 6/2003 |
| EP | 1 147 794 | 10/2001 |
| EP | 1 170 042 | 1/2002 |
| JP | 2001-9159 | 1/2001 |
| JP | 2001-286678 | 10/2001 |
| JP | 2001-351125 | 12/2001 |
| JP | 2003-053024 | 2/2002 |
| JP | 2002-306846 | 10/2002 |
| JP | 2002-320253 | 10/2002 |
| JP | 2002-346223 | 12/2002 |
| JP | 2002-355443 | 12/2002 |

*Primary Examiner*—John M. Hotaling, II
*Assistant Examiner*—Meagan Thomasson
(74) *Attorney, Agent, or Firm*—Jordan and Hamburg LLP

(57) ABSTRACT

It is an object of the present invention to increase the game operability, and to increase the feeling of pressure and feeling of actual presence on the scene, by making it possible to display partial enlarged images of the scope displays or each of a plurality of players in a manner that allows mutual influence on the screen on which the game images are displayed. The apparatus of the present invention is a video game apparatus in which the game is caused to proceed by shooting with four imitation guns 30 from the front surface of a display part 11 on which game images are displayed; in this apparatus, respective enlarged images are created and displayed from an infrared camera 40 that can detect in a discriminating manner respective light spots on the screen from the laser light emitters 32 of the respective imitation guns 30, and positional data of the images displayed in regions that include the light spots corresponding to partial regions that include the respective light spots on the screen of the display part 11.

17 Claims, 19 Drawing Sheets

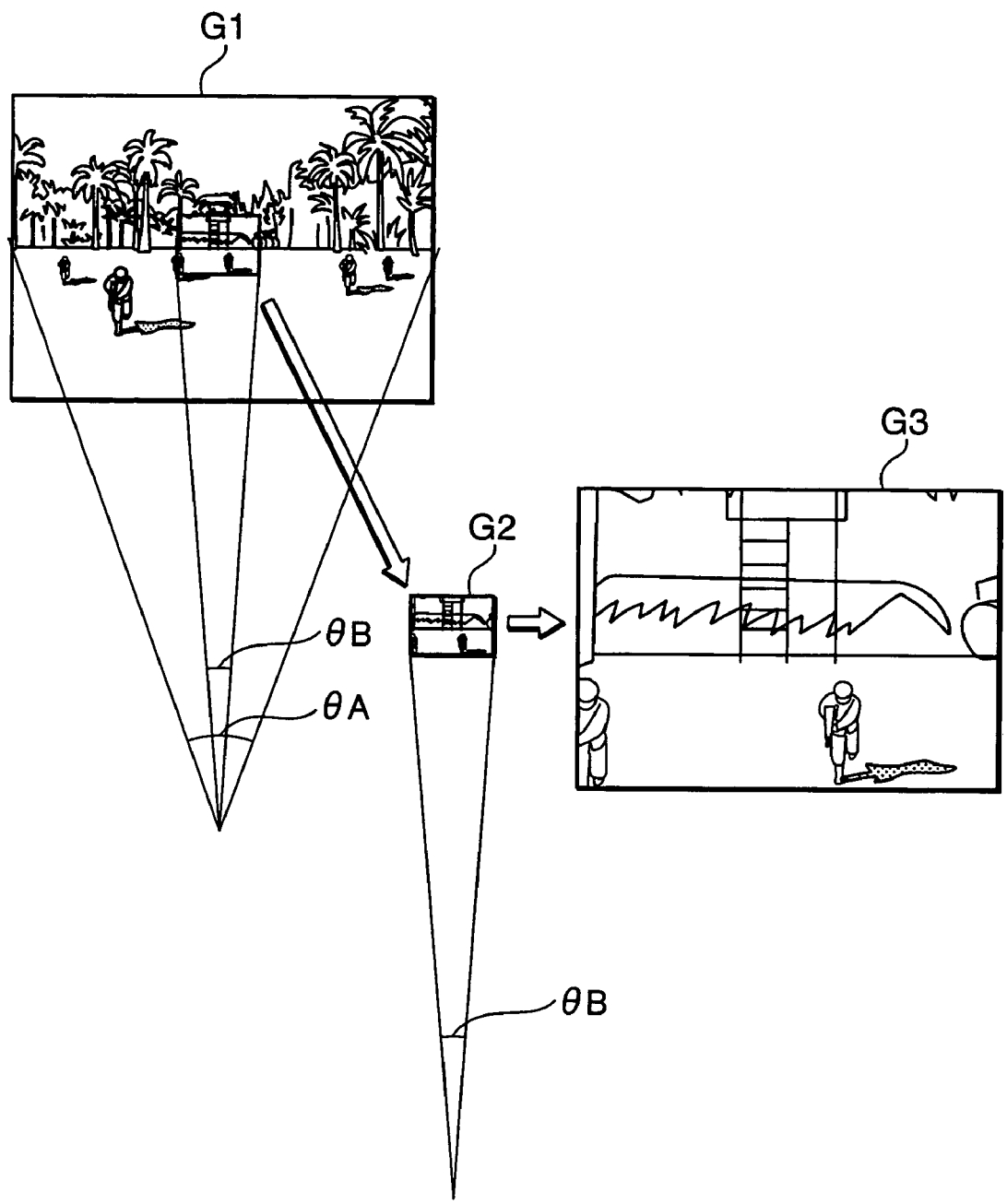

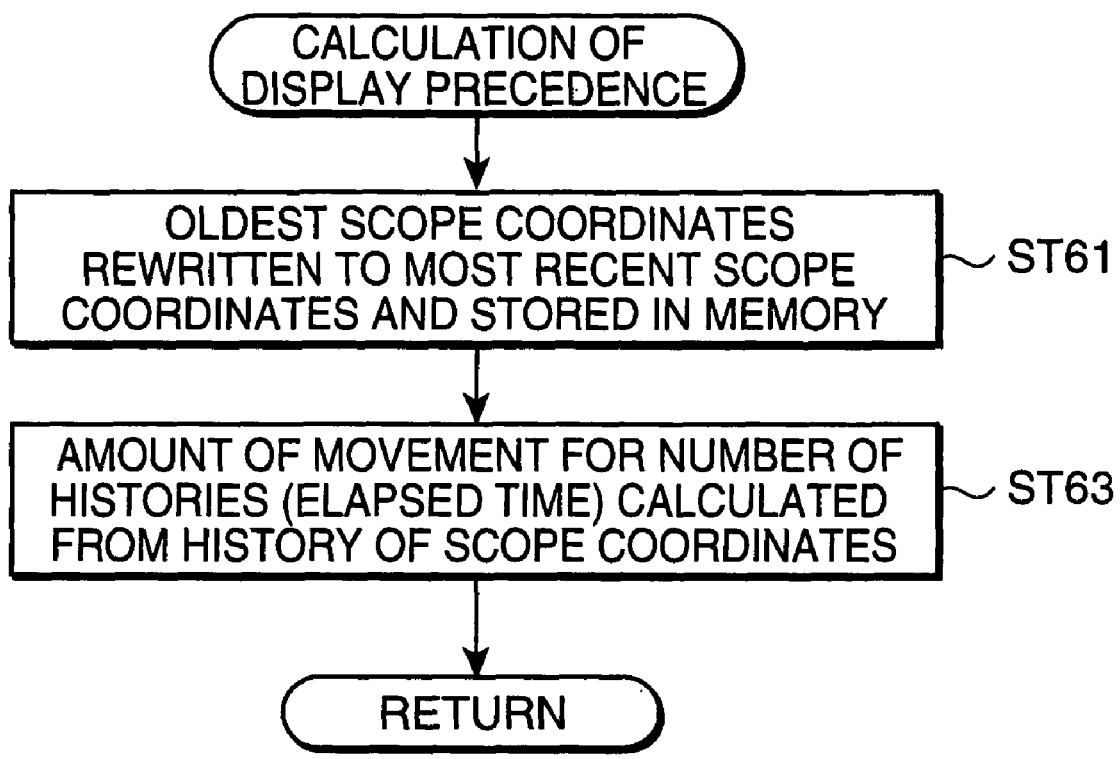

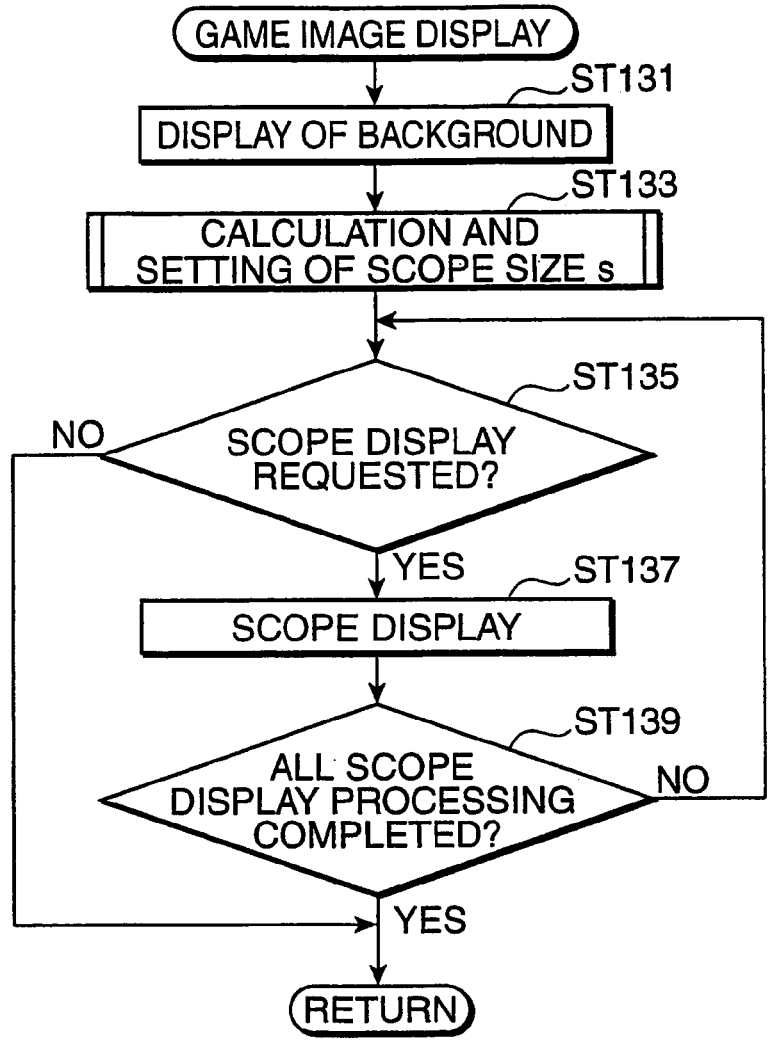
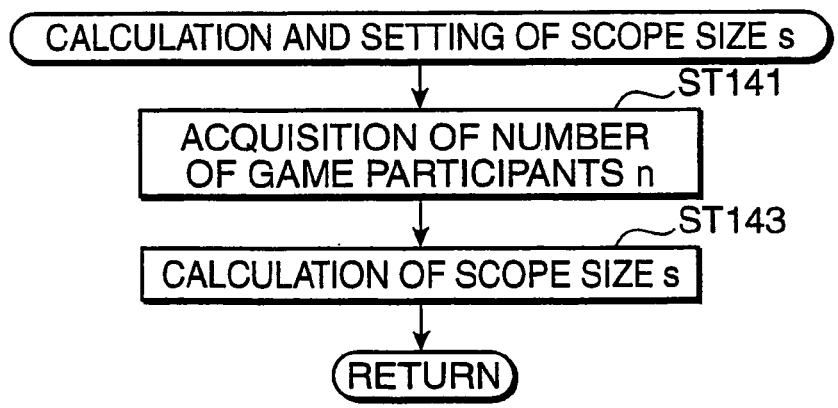

VIDEO GAME APPARATUS, IMAGE PROCESSING METHOD AND PROGRAM

BACKGROUND OF THE INVENTION

1. Field of the Invention

The present invention relates to a video game apparatus, image processing method and program which display game images on a monitor screen, and allow play by a plurality of players.

2. Description of the Related Art

Numerous shooting game apparatuses in which virtual combat with enemy characters in game images is carried on using a plurality of model guns on a single monitor on which the game images are displayed have been known in the past. Among these, games are also known in which the orientations of a plurality of imitation guns are detected, the positions where the muzzles of the guns intersect with the monitor screen are respectively calculated, and the players are caused to guide the orientations of the muzzles of the guns so that pointers with a red color or the like (indicating the aim) are displayed in these positions by image processing. Furthermore, in shooting games of this type, a shooting game apparatus has been proposed in which the imitation guns are equipped with imitation scopes that contain a liquid crystal display device, and an enlarged image of the image on the monitor screen corresponding to the aiming position of the gun is displayed on this liquid crystal display device, in order to create a sense of actual presence and a sense of pressure (Japanese Patent Application Laid-Open No. H7-181934). Furthermore, in shooting games of this type, a game system has been proposed in which desired positions on the game image can be designated by operating input from a pad-form game controller, image frames imitating a scope are displayed in these designated positions, and enlarged images of the images in the vicinity of the designated positions within the displayed image frames are displayed, so that the player plays the shooting game while observing the enlarged images (Japanese Patent Application Laid-Open No. 2001-286678).

In the case of a shooting game apparatus that displays pointers, the aim at enemy characters within the game image can be skillfully determined to the extent that the orientation of the gun muzzle is guided. However, the game image itself remains "as is", so that this is not a game in which shooting is performed while the player observes details of the enemy character images. Accordingly, there are fixed limits to this game as a game. Furthermore, in the case of a shooting game apparatus in which liquid crystal display devices are contained in the imitation scopes, enlarged images are displayed on the liquid crystal display devices of the respective imitation guns. Accordingly, although there is no particular problem even if the game is a game involving a plurality of players, the respective players cannot ascertain the aiming positions of the other players; consequently, the game does not differ greatly from a game played by a single player, so that there tends to be little feeling of pressure or (for example) feeling of cooperation. Furthermore, in the case of a game system that displays enlarged images within image frames that imitate scopes, since no measures are taken in order to display a plurality of image frames (scopes) within a single screen, play by more than one person is substantially impossible, so that the feeling of cooperation in a game that allows cooperative play by a plurality of players cannot be obtained.

SUMMARY OF THE INVENTION

With the foregoing in view, it is an object of the present invention to provide a video game apparatus, image processing method and program which heighten the game operability by making it possible to display, in a manner that allows mutual influence, partial enlarged images such as scope displays or the like for each of a plurality of players on the screen of a single monitor on which a game image is displayed, and which has a high feeling of pressure and feeling of actual presence on the scene.

In order to achieve the above object, the invention according to the present invention is a video game apparatus which displays game images on a monitor screen and allows play by a plurality of players, comprising position designating means for respectively designating desired positions on the abovementioned monitor screen in accordance with instructions from a plurality of locations, and enlarged image display means for producing enlarged images that correspond to enlarged images of images displayed within specified regions that include the abovementioned designated positions, and displaying the abovementioned enlarged images in accordance with the mutual relationship of the abovementioned respective positions so that the abovementioned designated positions within the abovementioned monitor screen are included.

BRIEF DESCRIPTION OF THE DRAWINGS

FIG. 4 is a diagram which is used to illustrate the processing that creates the scope image;

FIG. 11 shows the "display precedence calculation" processing subroutine;

FIG. 15 shows another subroutine of the "game image displays" processing of step ST23;

FIG. 16 shows the subroutine of the "scope size s calculation and setting" processing in step ST133;

DESCRIPTION OF THE PREFERRED EMBODIMENTS

Figure 1:
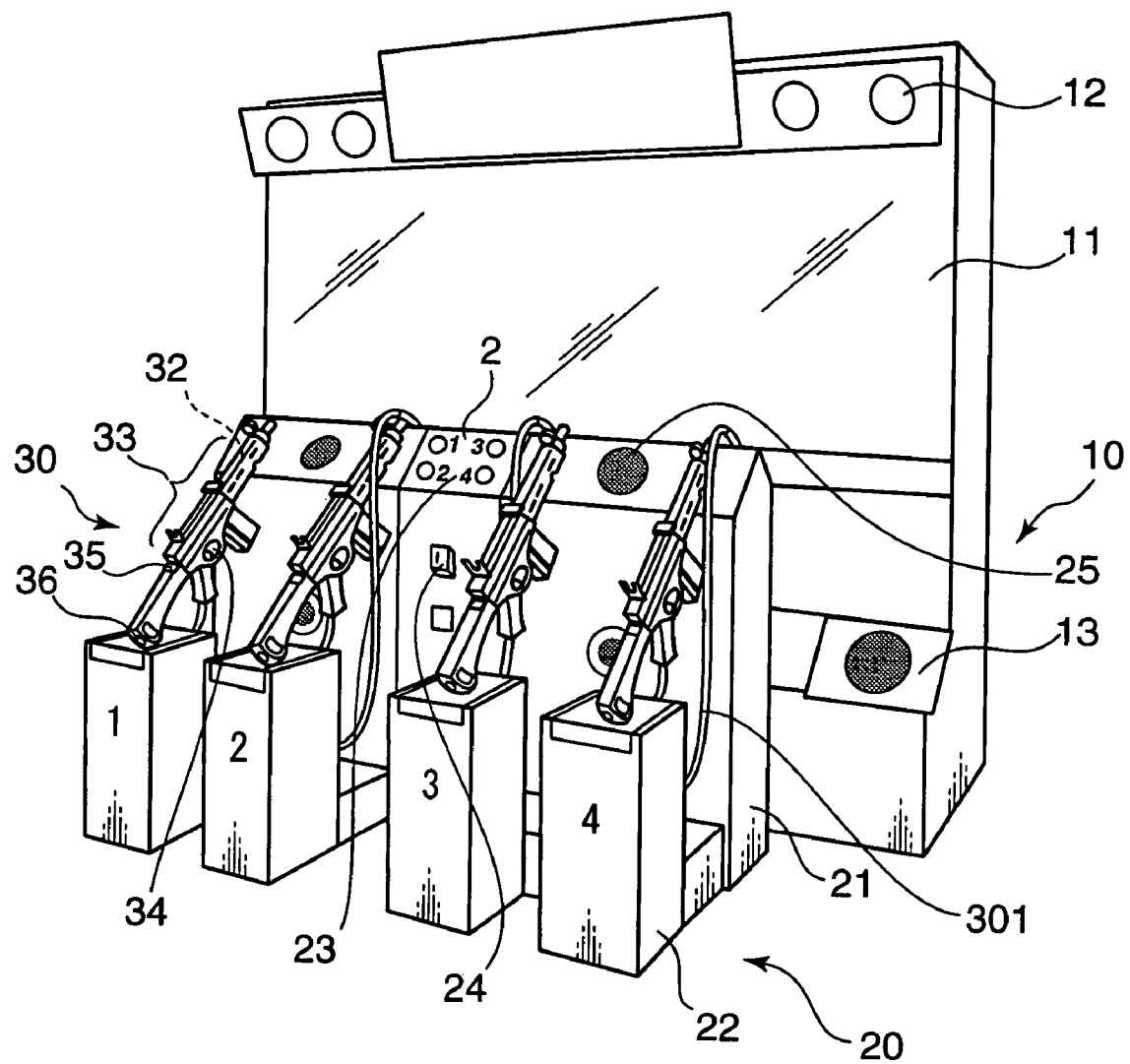
FIG. 1 is an overall schematic structural diagram of one embodiment in which the video game apparatus of the present invention is applied to a shooting game apparatus.

FIG. 1 is an overall schematic structural diagram of one embodiment in which the video game apparatus of the present invention is applied to a shooting game apparatus. In FIG. 1, the shooting game apparatus comprises a main body housing part 10, an operating housing part 20 which is disposed in front of the main body housing part 10, and a plurality of imitation guns 30 (e. g., four imitation guns 30).

The main body housing part 10 has a substantially solid-rectangular shape, and comprises a display part 11 as a monitor that extends to the left and right from roughly the center of the front surface. Audio speakers 12 are disposed on the left and right on the upper part of the display part 11, and speakers 13 used for audio output, and especially to output sounds that create pressure such as heavy and low sounds or the like, are disposed on the left and right on the lower part of the display part 11. A CRT, liquid crystal screen, plasma display or organic EL display can be used as the display part 11. Alternatively, a universally known projector or liquid crystal projector may be used.

The operating housing part 20 comprises an operating part 21 with a solid-rectangular shape (long in the lateral direction) which has a specified height, preferably a height that is substantially the same height as the lower-end position of the display part 11, and four gun mounting stands 22 that are disposed on the left and right with a lower attitude. On the operating panel 2, four start buttons 23 are disposed on the upper part of the left-right central position together with discriminating symbols (the numerals "1", "2", "3" and "4" in the present embodiment), and an insertion slot 24 into which a specified number of coins are inserted in order to obtain permission to play the game is disposed in the lower part. The respective discriminating symbols assigned to the start buttons 23 correspond to the four gun mounting stands 22. A control part 100 (see FIG. 3) which controls the overall action of the present shooting game is disposed inside the main body housing part 10. The control part 100 (FIG. 3) performs processing that associates the start buttons 23 and imitation guns 30 by means of the discriminating symbols.

Furthermore, although this is not shown in FIG. 1, an infrared camera 40 (see FIG. 3) is disposed (in a configuration which is such that the entire screen of the display part 11 is the visual field of this camera) in a central position on the upper part of the operating part 21 on the front side facing the display part 11. The installation position of the infrared camera 40 is not limited to the side of the operating part 21; as long as this position allows viewing of the screen of the display part 11, this position may be located on a specified member other than the main body housing part 10 or operating part 21. Furthermore, in cases where the display part 11 comprises a projector, and a semi-transparent projection screen is used, the infrared camera 40 may be disposed so that the screen is viewed from the inside of the main body housing part 10, i. e., from the back side of the projection screen.

Figure 2A:
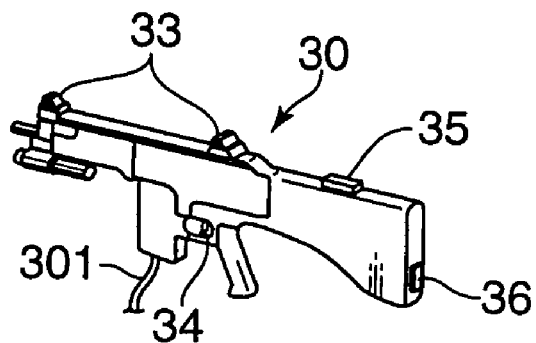
FIG. 2 shows structural diagrams of the imitation guns, with FIG. 2A being an overall perspective view, FIG. 2B being a side view, FIG. 2C being a view of the attitude used to sight through the scope, and FIG. 2D being a view of the ordinary attitude.
Figure 2B:
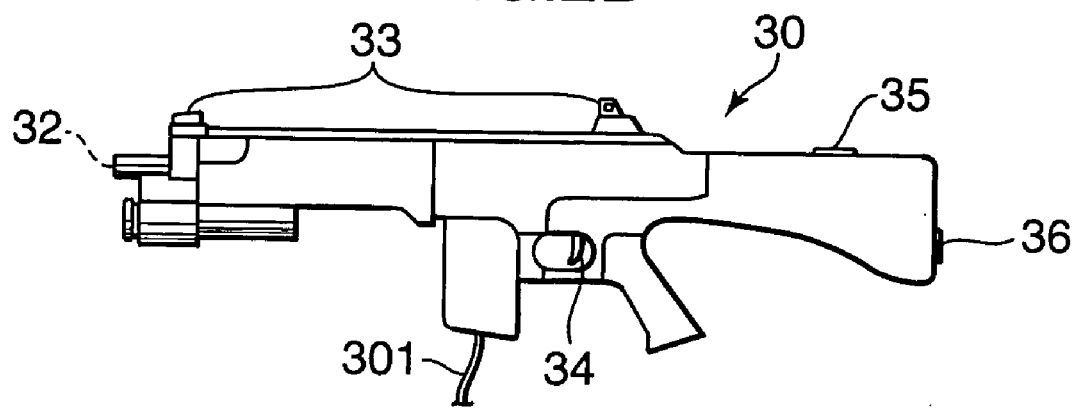
Figure 2C:
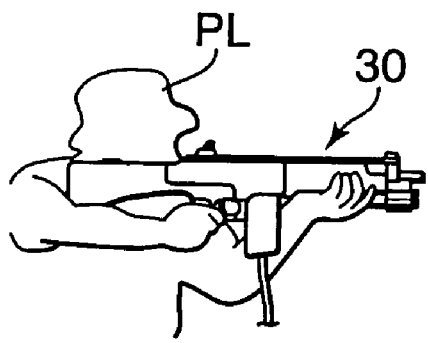
Figure 2D:
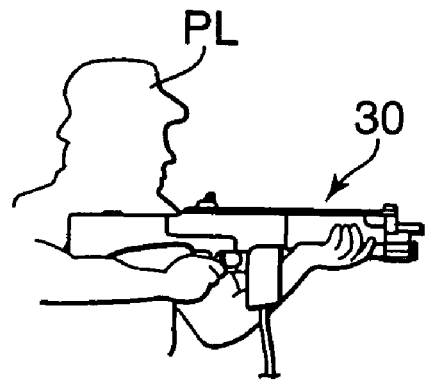

FIG. 2 shows structural diagrams of the imitation guns, with FIG. 2A being an overall perspective view, FIG. 2B being a side view, FIG. 2C being a view of the attitude used to sight through the scope, and FIG. 2D being a view of the ordinary attitude. In FIG. 2, there are four imitation guns 30 which have the same shape and function. Each imitation gun 30 is connected to the operating part 20 via a cable 301. Each cable 301 contains a power supply line and signal line, and also functions to prevent theft of the imitation gun 30. The imitation guns 30 model the general structure of a rifle with a gun body part, a gun barrel part, a shoulder stock part and a trigger part. A laser light emitter 32 (see FIG. 3) which emits laser light in the infrared wavelength band toward the front of the gun muzzle is contained as light projecting means inside each gun muzzle part. An aiming device 33 is disposed on the upper surface of the gun body. The laser light emitters 32 and infrared camera 40 respectively constitute position detection means, and position designating means are constituted by the laser light emitters 32 and infrared camera 40.

A trigger 34 modeling an actual trigger is disposed on the lower part of the gun body part of each imitation gun 30, and a trigger switch 341 (see FIG. 3) which is switched on in response to a pulling action on the trigger 34 is contained in the gun body part. The triggering operation is detected by this trigger switch 341, and processing is performed as a virtual shooting operation. Furthermore, an ocular sensor 35 is disposed in the position where the eye used to aim the aiming device 33 is placed, and a shoulder sensor 36 which detects the contact of the shoulder is disposed on the shoulder stock part. Proximity sensors such as photo-sensors, dielectric sensors or the like may be used as the ocular sensor 35 and shoulder sensor 36; alternatively, mechanical switches may also be used. As is shown in FIG. 2C, in the attitude in which aiming is performed via the scope, the ocular sensor 35 contacts the cheek of the player PL, and the shoulder sensor 36 contacts the shoulder of the player PL; as a result, the fact that the player PL is aiming via the scope is detected. Furthermore, as is shown in FIG. 2D, in the attitude in which the gun is ordinarily held, the shoulder sensor 36 contacts the shoulder of the player PL, and the ocular sensor 35 is switched off; as a result, it is detected that the player PL is holding the gun in an ordinary attitude. Furthermore, the ocular sensor 35 and shoulder sensor 36 are constructed in order to provide judgement information to the player actin detection part (described later). The player action detection part preferably performs processing with a scope display request (described later) indicated when the ocular sensor 35 and shoulder sensor 36 are simultaneously switched on; in the present embodiment, scope mark images are displayed within the gam image displayed on the display part 11 (as will be described later).

For example, in the game system described in Japanese Patent Application Laid-Open No. 2001-286678, a pad-form game controller is used when the positions that display the scope are instructed; accordingly, in shooting, there is little actual feeling of aiming at a target while sighting through a scope, so that there are limits to realizing a feeling of reality as a shooting game. In the present construction, however, when the players aim the imitation guns 30, scope images are displayed on the screen G1. Specifically, when the players aim the imitation guns 30, the players can observe scope images that freely move across the screen G1 while the players observe this screen G1. Accordingly, the players can realistically experience the feeling of aiming at a target while holding the gun and sighting through the scope, so that the interest of the game as a shooting game is increased. Furthermore, the laser light emitters 32 may have a configuration in which these emitters are switched on during the duration of the game, or a configuration in which these emitters are switched on only when the triggers 34 are operated (i.e., pulled at least half-way, in a configuration using a sensor structure that can discriminate between the half-pulled state and fully pulled state of the trigger 34).

The infrared camera 40 has the screen of the display part 11 as a visual field frame, and detects light in the infrared wavelength band. This camera 40 is used to allow imaging of the spot light (invisible to the players PL) that is emitted from the imitation guns 30 and that reaches the screen of the display part 11, and to obtain the coordinates of the imaging positions of the spot light on the screen by conducting the acquired images to the control part 100 (see FIG. 3). Specifically, positions in the longitudinal and lateral directions on the screen of the display part 11 and longitudinal and lateral arrangement (coordinate) positions of the CCD elements that are the imaging elements constituting the infrared camera 40 are caused to correspond as coordinates, and the positions on the display part 11 are obtained from the coordinates of the CCD elements imaging the spot light. Furthermore, since spot lights from a plurality of imitation guns 30 (four guns in the present embodiment) are present, the spot lights from the respective imitation guns 30 must be discriminated from each other when detected. This point will be described with respect to the synchronization processing part 108 of the control part 100 (described later). Furthermore, it would also be possible to detect movement of the imitation guns 30 by the players PL by disposing an acceleration sensor or a movement sensor 37 using a piezoelectric element (see FIG. 3) in an appropriate location, e.g., near the gun muzzle, in each imitation gun 30.

Figure 3:
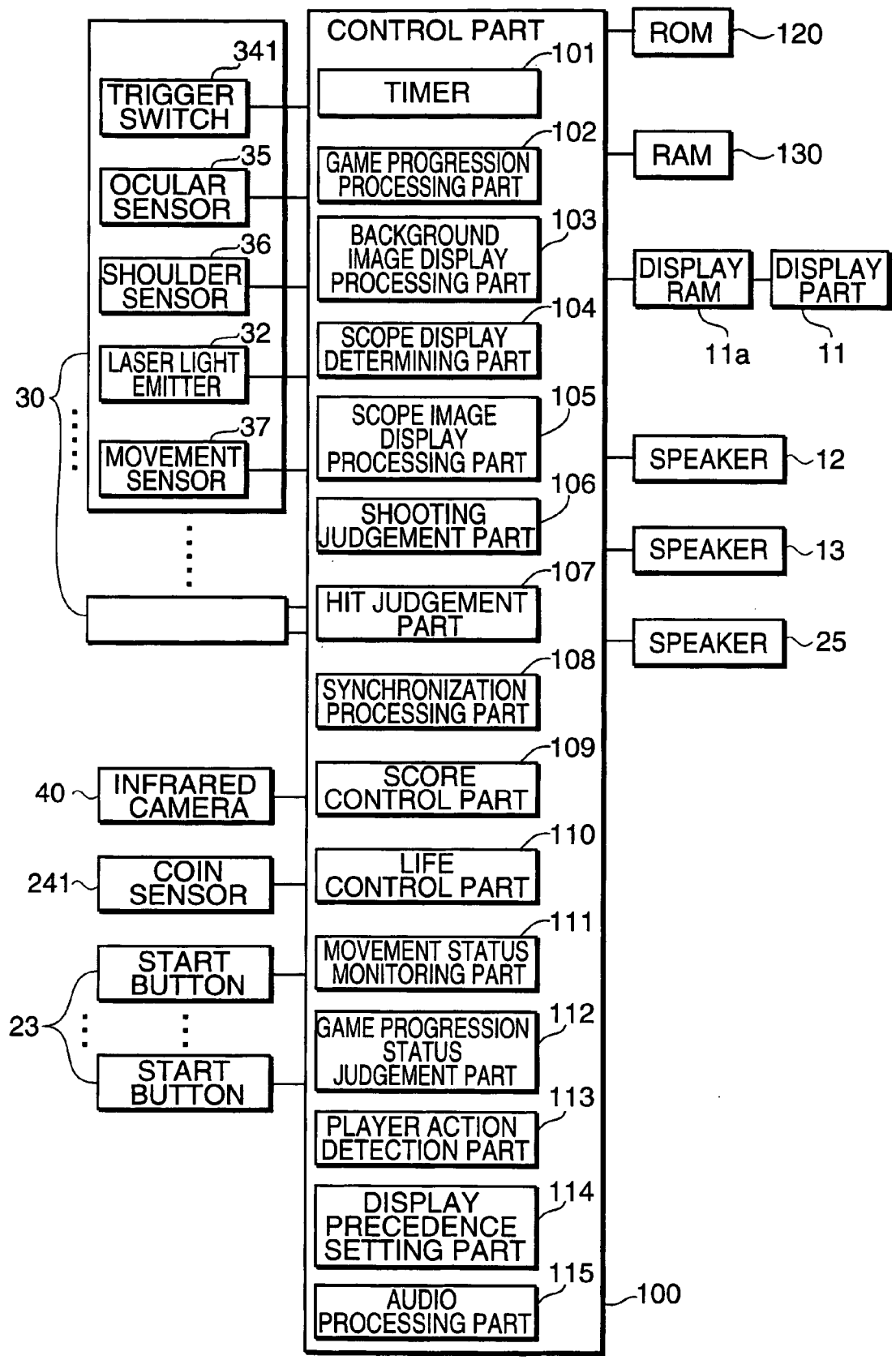
FIG. 3 is a block structural diagram of the present shooting game apparatus.

FIG. 3 is a block construction diagram of the present shooting game apparatus. The present shooting game apparatus comprises a control part 100 that has a microcomputer or the like, and also comprises a ROM 120 that accommodates various types of data required for game processing, such as game images, game programs, audio data such as effect sounds or the like, and other data, and a RAM 130 that temporarily holds data during processing. The recording medium in which game programs and the like are stored is not limited to a ROM 120; various types of memories can be used. Furthermore, a configuration may also be used in which required types of data are provided by installing game programs or the like in this recording medium from the outside, or by mounting a recording medium in which such data has been installed in the present apparatus. The game images are three-dimensional images in the present embodiment; various types of objects such as back ground images, enemy characters and other objects (e.g., objects for the display of proximate explosions that portray the landing of shells in cases where the shooting misses) are created using required numbers of polygons and textures.

The trigger switches 341, ocular sensors 35, shoulder sensors 36 and laser light emitters 32 of the four imitation guns 30 are connected to the control part 100 via the cables 301. The control part 100 is devised so that this control part can discriminate which of the imitation guns 30 is the origin of the detection signals from the trigger switches 341, ocular sensors 35 and shoulder sensors 36, and so that laser light emission instructions can be output to specified imitation guns 30. The coin sensor 241 detects the insertion of a specified number of coins into the insertion slot 24.

The display RAM 11a has a memory capacity that stores the game images displayed on the display part 11; the memory contents are repeatedly updated at specified intervals, e.g., each 1/60 of a second, and are read out to the display part 11 at this time.

The control part 100 comprises an internal timer 101, and also comprises the following function executing parts. The gram progression processing part 102 receives respective operations and detection signals from the respective imitation guns 30, and controls the progression of the gam in accordance with a game program stored in the ROM 120. In the present embodiment, the system is devised so that other players PL can participate in the game while the game is in progress. When the insertion of coins is detected by the coin sensor 241, and a signal indicating that a specified start button 23 has been depressed is input, the imitation gun 30 corresponding to this start button 23 is placed in an operable state, so that participation in the same game is allowed. The background image display processing part 103 displays the game image from the virtual viewpoint of the camera on the display part 11 as shown on the screen G1 in FIG. 4.

The scope display determining part 104 preferably instructs the display of images of scope marks (described later) corresponding to the imitation guns 30 when the ocular sensors 35 and shoulder sensors 36 of the imitation guns 30 are simultaneously on. Furthermore, the scope display determining part 104 may also display images of scope marks when either the ocular sensors 35 or shoulder sensors 36 of the imitation guns 30 are in an "on" state.

The scope image display processing part 105 performs display processing of the scope images corresponding to the respective imitation guns 30, e.g., as shown in FIG. 4.

Specifically, using the coordinates of the spot lights at the points in time at which the trigger "on" signals are generated as a reference, the scope image display processing part 105 performs processing in which a small screen G2 with a size having a proportional screen angle of θB corresponding to the preset scope magnification relative to the screen angle of θA that is obtained when the entire screen G1 is viewed from the virtual viewpoint of the camera is specified, and a screen G3 (scope magnification=θA/θB) is obtained in which the image data contained in the abovementioned screen G2 is read out from the ROM 120 and recreated with the original drawn screen angle of θA (i. e., image drawing processing is re-executed). If this is done, then an image G3 corresponding to an enlarged image of the image G2 is obtained. Furthermore, the scope image display processing part 105 performs processing in which the image of the screen G1 is first expanded in the display RAM 11*a*, and an image with a specified shape, e. g., a circular display frame with a specified diameter (only the inside of the frame is transparent) is superimposed on the center of the screen G3, and this display frame and the image of the screen G3 positioned in the transparent portion inside the frame are overwritten on the display RAM 11*a* with the center of the display frame matched to the coordinates (e. g., coordinate points) of the spot light, so that the scope image is displayed superimposed on the screen G1 in the display pat 11.

Figure 5A:
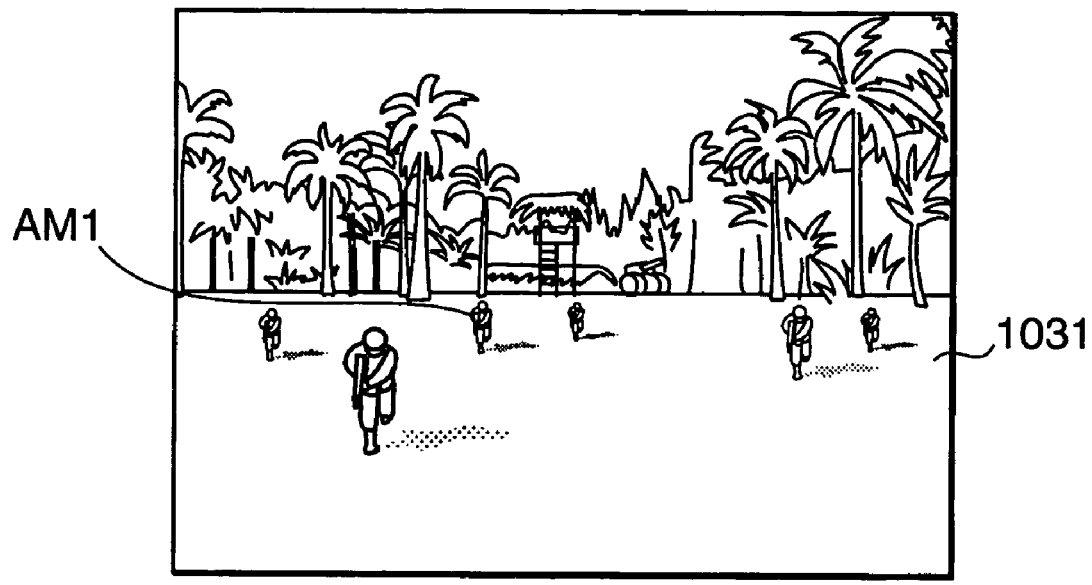
FIG. 5 shows screen diagrams that illustrate examples of game screens, with FIG. 5A showing a screen with no scope display, and FIG. 5B showing a screen with a scope display.
Figure 5B:
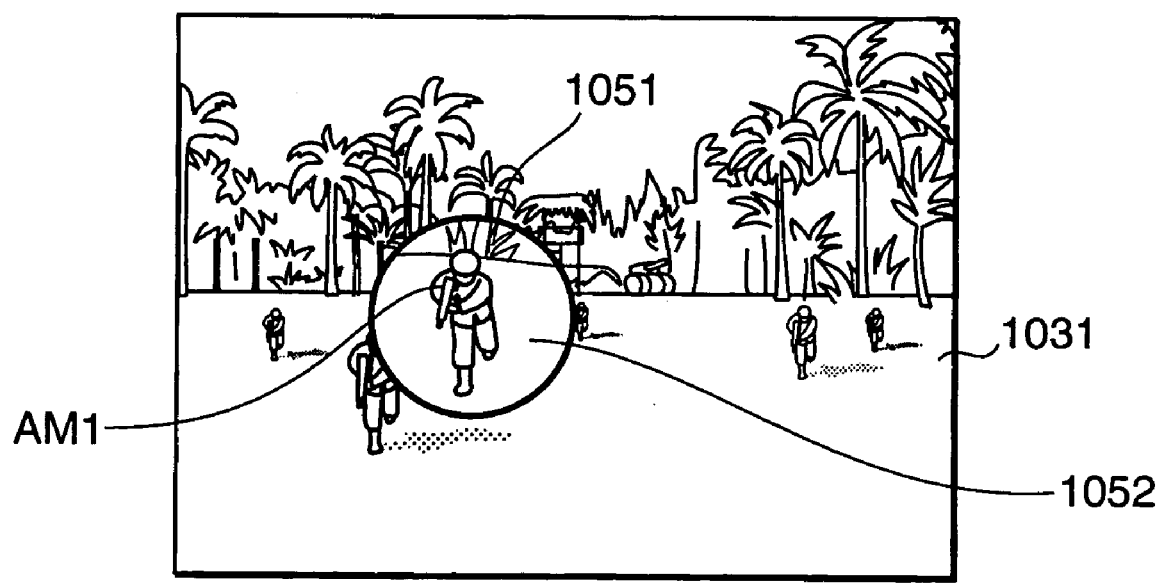

FIG. 5 shows screen diagrams that illustrate examples of game screens, with FIG. 5A showing a screen with no scope display, and FIG. 5B showing a screen with a scope display. In FIG. 5A, one enemy character AM1 is drawn in one location of the background image 1031, and when the spot light from one of the imitation guns 30 strikes this position, a scope mark 1051 with a circular frame is displayed in this position, and a scope image 1052 (referred to as enlarged corresponding image or referred to as enlarged image) which is enlarged (for example) by a method described later is displayed inside this scope mark 1051, as shown in FIG. 5B. Specifically, the scope image display processing part 105 functions as an enlarged corresponding image display part in the present invention.

Furthermore, the scope image display processing part 105 continuously displays scope images on the screen G1 while the display of scope mark images is instructed by the scope display determining part 104. Specifically, the scope images continue to be displayed in accordance with the imitation guns 30 while the ocular sensors 35 and shoulder sensors 36 of the imitation guns 30 are simultaneously on, and in cases where the orientation of one of the imitation guns 30 varies during this period so that the spot light moves, the position instructed by the imitation gun 30 varies with the scope image displayed "as is", so that to the player, the scope image moves across the screen G1 in accordance with the orientation of the imitation gun 30. As a result of this construction, the players can observe the screen G1 while aiming the imitation guns 30, and can simultaneously observe the scope images that move freely across the screen G1; accordingly, the players can realistically experience a sensation of aiming at a target while holding the gun and sighting through the scope. Thus, the interest of the game as a shooting game is increased.

Furthermore, in cases where scope marks 1051 corresponding to a plurality of imitation guns 30 are in close proximity, and overlap with each other, the scope image display processing pat 105 performs display precedence imaging (described below).

The shooting judgement part 106 determines whether or not the triggers 34 of the model guns 30 have been pulled so that the trigger switches 341 are switched on. The hit judgement pat 107 controls the display coordinates of the respective object images including the enemy characters AM displayed on the display part 11, reads the coordinates of the illumination positions of the spot lights from the imitation guns 30 at the points in time at which trigger "on" signals are output, and performs processing that judges a "hit" in cases where these coordinates coincide with the display coordinates of an enemy character AM, and a "miss" in cases where these coordinates do not coincide. Furthermore, the background image display processing part 103 calculates the tracks along which the bullets fired from the player side fly through space, and performs a display depicting a "hit" (e. g., erasure of the enemy character AM from the image) in the case of a "hit", or a display depicting a proximate explosion or the like for the position where the bullet lands in the case of a "miss".

In the present embodiment, the synchronization processing part 108 performs processing used to specify which of a maximum of four laser light emitters 32 is the originating laser emitter 32 of each spot light on the screen of the display part 11. Specifically, the synchronization processing part 108 causes the laser light emitters 32 of the respective imitation guns 30 to perform a light emitting action for a specified period (e. g., 4 times the period of the imaging operation of the infrared camera 40), and with the respective phases shifted by ¼ each, for only one period, i. e., in order one at a time. If this is done, then position detection which makes it possible to discriminate (i. e., by timing control) the spot light from each laser light emitter 32 can be performed for each imaging operation of the infrared camera 40. Alternatively, each light emitting operation may be repeated with a period that extends over a plurality of periods of the imaging operation, in a form in which the timing is respectively shifted by an amount equal to the imaging period.

The game score control part 109 receives trigger "on" signals from the respective imitation guns 30, and evaluates the ability of the players operating the respective imitation guns 30 by converting this ability into numerical values with consideration given to the number of hits (or hit rate) on enemy characters appearing in the game image, the game time controlled by an internal timer 101 and the like; thus, this part functions as play status evaluation means. The life control part 110 controls the life that constitutes the game points or scores of the players in the game. For example, the life increases when a shot hits an enemy character, and decreases when the player is hit by an attack from an enemy character. For example, the presence or absence of a hit during an attack by an enemy character can be judged using various types of information such as the relationship between the left-right trajectory of shots from enemy characters and the installation positions of the gun mounting stands 22, indication as to whether or not the imitation guns 30 are in the attack mode (with triggers 34 pulled), indication as to whether or not the scope display is in use, and the like. Furthermore, in the present game, the system is devised so that if the life is lowered to a specified value, e. g., a value of zero, during the gam, the game is forcibly ended by the game progression processing part 102.

The movement status monitoring part 111 used as movement status monitoring means inputs over time (i. e., periodically) the coordinate positions of the spot lights obtained by the scope image display processing part 105 from the images acquired by the infrared camera 40 during scope display, monitors these coordinate positions as the movement histories of the designated positions, and in particular calculates the amounts of movement. Furthermore, the movement status monitoring part 111 may also be devised so that this part monitors the movements of the imitation guns 30 themselves from the detection signals of movement sensors 37 installed as necessary.

The game progression status judgement part 112 used as game progression status judgement means inputs the game status determined by the game progression processing part 102, and judges the progression of the game, game scene and (in cases where the game is constructed from a plurality of stages) the stage of the game.

The player action detection part 113 used as player action detection means detects the actions of the players, i. e., the attitude in which the imitation guns 30 are held, and whether or not the players show a body attitude of aiming the guns. In regard to the detection of the attitude in which the imitation guns 30 are held, this can be detected as described above according to whether the ocular sensors 35 and shoulder sensors 36 of the imitation guns 30 are simultaneously on (see FIG. 2C), or whether only the shoulder sensors 36 are on (see FIG. 2D). Furthermore, in the cases of both FIG. 2C and FIG. 2D, it is assumed that scope images are being displayed. Alternatively, it would also be possible to install an imaging device in an appropriate location on the main body housing part 10, and to detect the attitude of the imitation guns 30 held by the players directly by imaging the players. In this case, the question of whether or not the players are showing an aiming body attitude can be determined from the presence or absence of movements of the players body, e. g., amount of movement, speed of movement, frequency of movement and the like, in addition to the attitude in which the imitation guns 30 are held by the players, and/or by considering the "on" and "off" signals of the ocular sensors 35 and shoulder sensors 36 of the imitation guns 30 as well. Instead of an imaging device, it would also be possible to use a configuration in which an ultrasonic transmitter is installed in an appropriate location above the heads of the players, ultrasonic receivers are installed on the left and right sides, ultrasonic waves are transmitted downward from the transmitter, reflected by the heads of the players and received by the respective receivers, and the heights of the players heads and movements to the left and right are detected utilizing the propagation times of the received ultrasonic pulses from transmission to reception, and the differences in these times.

Figure 6A:
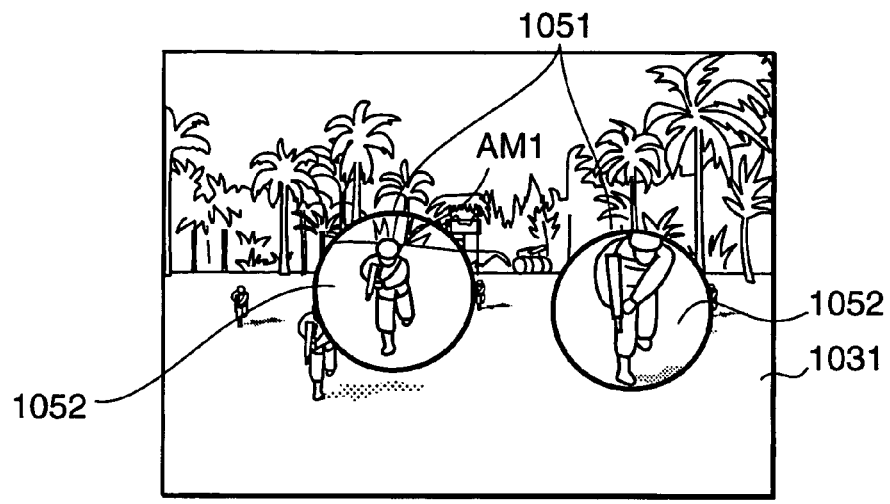
FIG. 6 shows game screen diagrams in which there are two scope displays within the screen, with FIG. 6A showing a state in which the two scope displays are separated, FIG. 6B showing a state in which the two scope displays are more or less beginning to overlap, and FIG. 6C showing a state in which most of the two scope displays overlap, with one scope display being preferentially displayed.
Figure 6B:
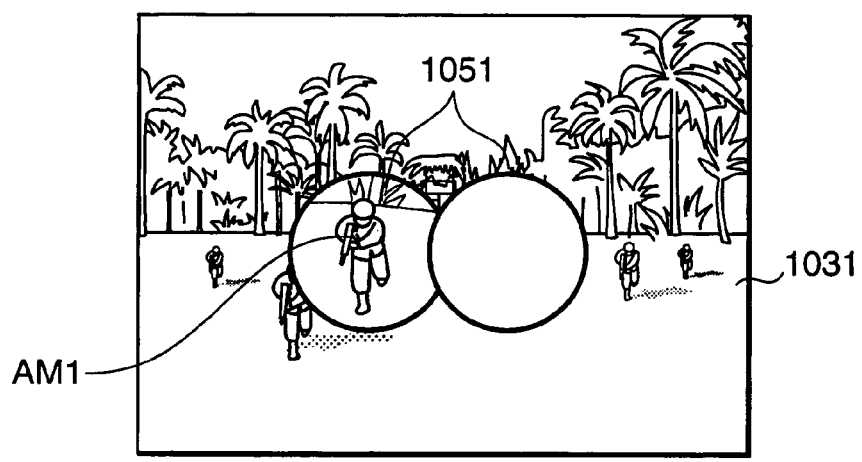
Figure 6C:
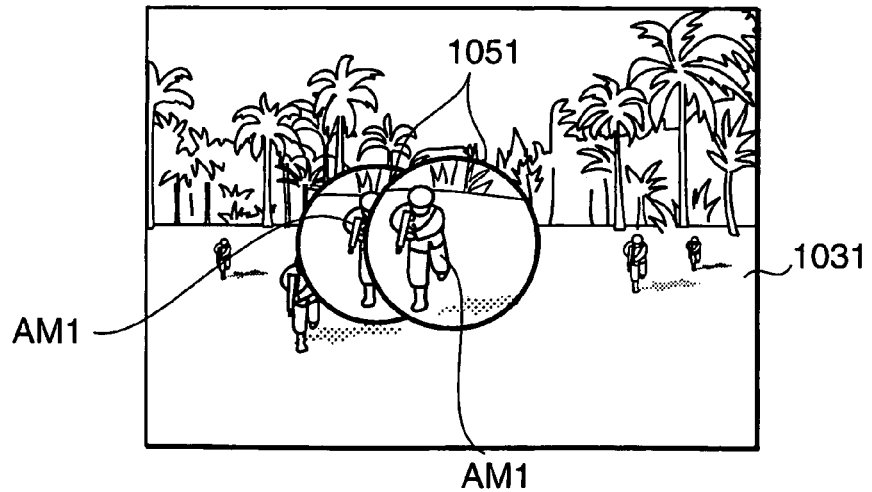

The display precedence setting part 114 sets the scope image 1052 that is preferentially written as overwriting in cases where the scope marks 1051 used as display frames corresponding to the respective imitation guns 30 overlap as a result of proximate positions within the screen being indicated by the respective imitation guns 30. For example, in FIG. 6, FIG. 6A shows a state in which two scope marks 1051 are separated to the left and right, FIG. 6B shows a state in which the right-side scope mark 1051 has moved to the left, and FIG. 6C shows a state in which the right-side scope mark 1051 has covered the scope image 1052 inside the left-side scope mark 1051 which has remained stationary on the original left side aiming at an enemy character AM1, so that this right-side scope mark 1051 impedes shooting. Accordingly, in cases where two or more scope marks 1051 are in close proximity, and especially in cases where these scope marks overlap, the question of how to display the overlapping region becomes a problem. Consequently, the display precedence in cases where two or more scope marks 1051 are in close proximity, and in cases where these scope marks overlap, is set according to a specified rule. In this rule, the coordinates of the respective spot lights obtained as designated positions by the detection of the respective spot lights directed from the respective imitation guns 30 and reaching the surface of the screen (as obtained by the scope image display processing part 105) are taken as the scope coordinates (e. g., the centers of the scope marks 1051), and the distances between these scope coordinates, the amounts of movement of the scope marks 1051 obtained by the movement status monitoring part 111 (and/or the amounts of movement of the imitation guns 30 detected by movement sensors 37), the play evaluation histories of the respective imitation guns 30 up to this point in time obtained by the game score processing part 109, the game scene status or the like obtained by the game progression status judgement part 112, and the status of player actions obtained by the player action detection part 113, are used as judgement elements. The respective configurations of the display precedence will be illustrated using flow charts and the like described later.

The scope image display processing part 105 successively writes the respectively prepared scope images into the display RAM 11a in accordance with the set display precedence, i. e., in the order of lower display precedence, so that in the case of overlapping regions, the scope image with the highest display precedence is finally displayed on the display part 11 (together with the display frame 1051 in the present embodiment). Furthermore, the scope marks 1051 are useful in facilitating discrimination of the boundaries between the scope images and the background image, and are used as necessary.

The audio processing part 115 outputs required sound effects, e. g., effect sounds such as shooting sounds, sounds of landing bullets, hits, proximate explosions and the like, from speakers 12, 13 and 25. The system may be devised so that the speakers 25 handle shooting sounds of the players, the speakers 122 handle attack sounds from the enemy characters, and the speakers 13 handle effect sounds such as the sounds of landing bullets, hits, proximate explosions and the like.

Figure 7:
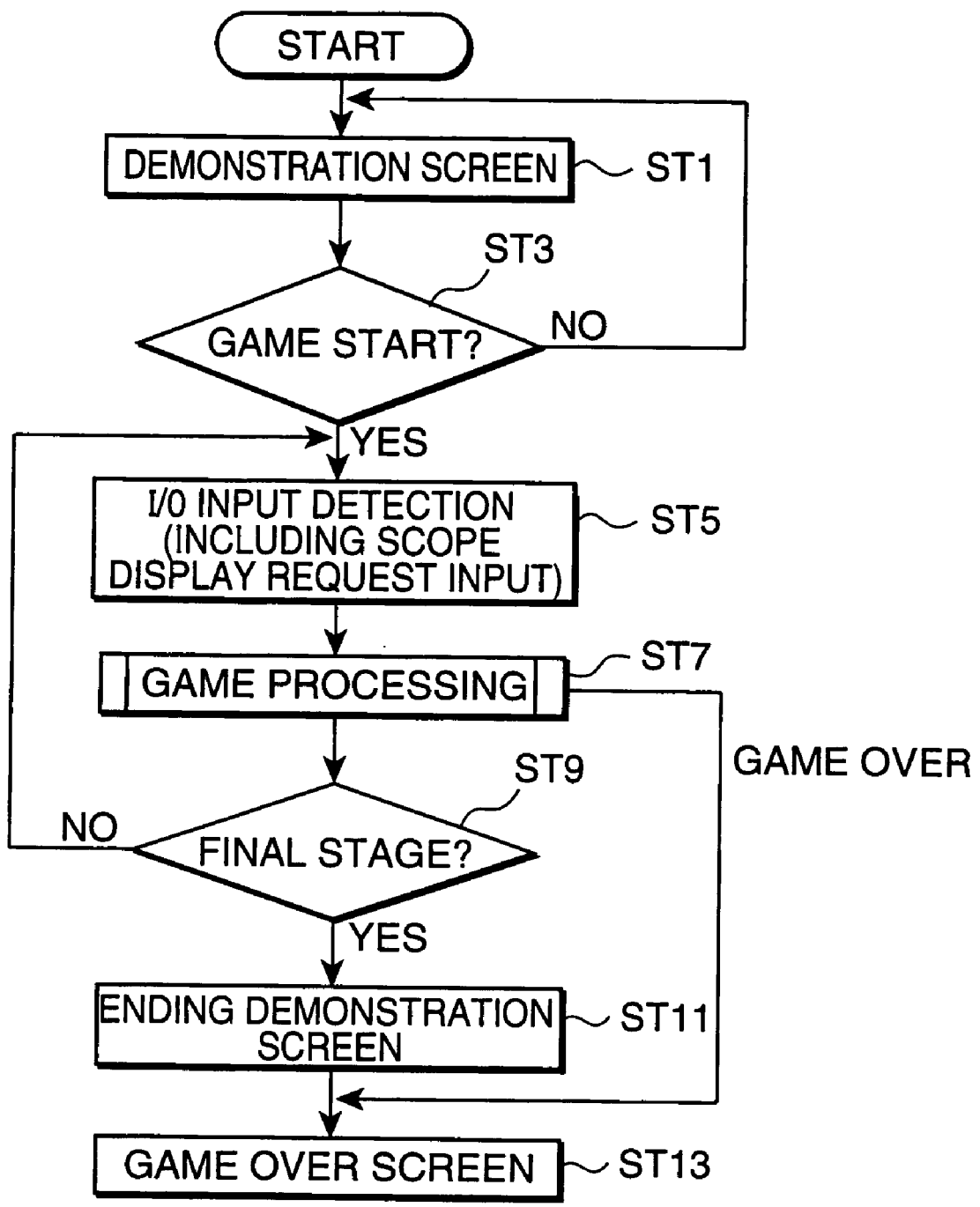
FIG. 7 is a basic flow chart of the game progression routine.

FIG. 7 is a basic flow chart of the game progression routine. When the power supply is switched on in the game apparatus, a specified demonstration screen is displayed (step ST1), and the system waits for the game (step ST3). Then, when coins are inserted, and at least one of the four game buttons 23 is operated, a signal from the I/O input of the control part 100 is detected (step ST5), and the system proceeds to game processing (step ST7). Here, if the life value is zero or the like, the game is over at an intermediate point; if this is not so, then the preset stage is cleared, the system successively proceeds to subsequent stages, and a judgement is made as to whether or not the final stage has been reached (step ST9). Then, when the final stage is cleared, an ending demonstration screen, e. g., a screen showing the game results such as the score or the like, is displayed (step ST11). The system then proceeds to the game over screen (step ST13), and the present game is ended.

Figure 8:
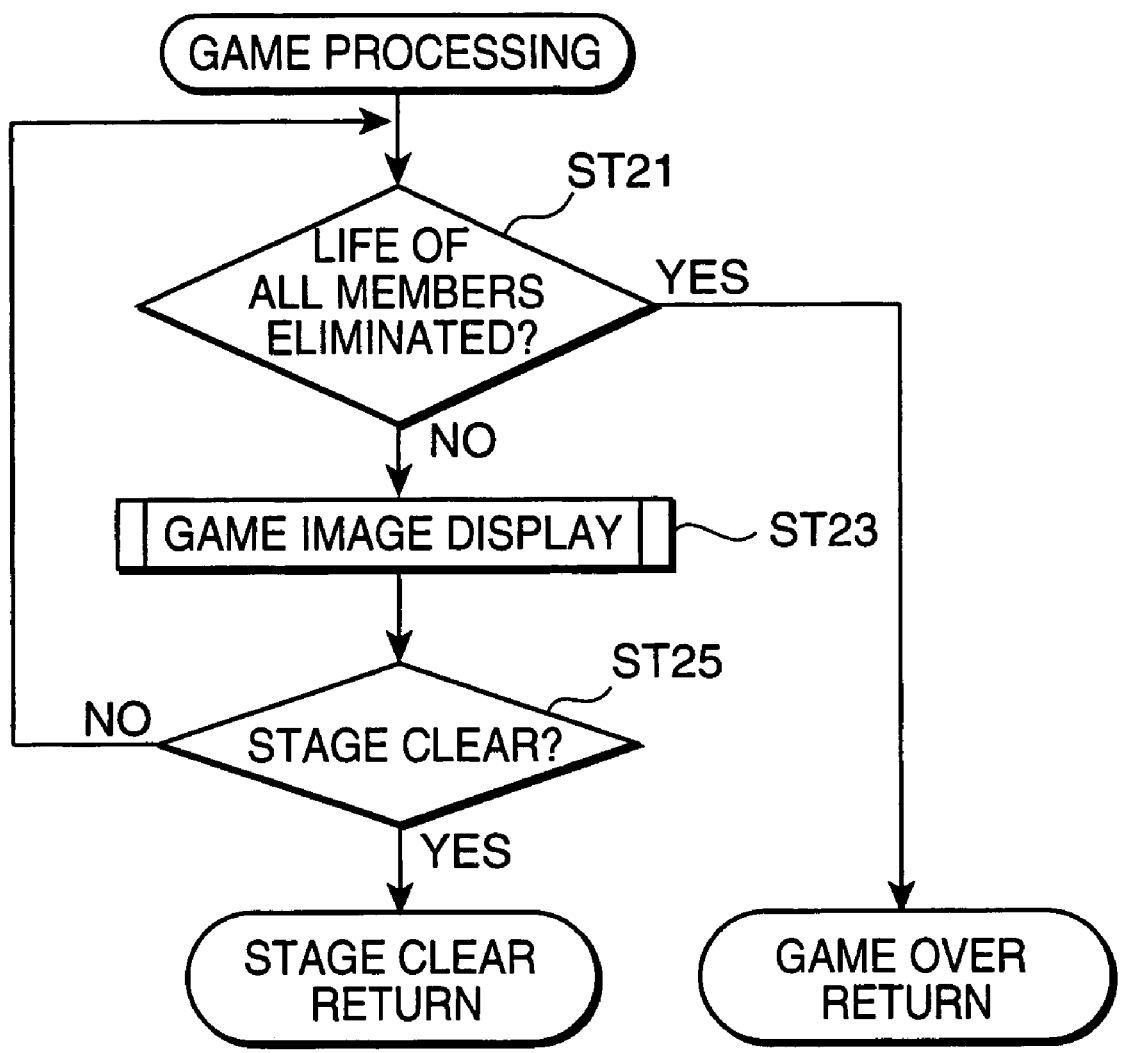
FIG. 8 shows the "gram processing" subroutine.

Furthermore, FIG. 8 shows the "game processing" subroutine in one stage of step ST7. In FIG. 8, a judgement is first made as to whether or not the lives of all of the players have been eliminated (step ST21). If this is so, the system returns as "game over". If at least one player has remaining life, the display processing of the game image is continued (step ST23), i. e., progression of the game is executed, and a judgement is made as to whether or not the stage has been cleared (step ST25). If the stage has not been cleared, the processing returns to step ST21, and the game is continued; if the stage has been cleared, the system returns as "stage cleared".

Figure 9:
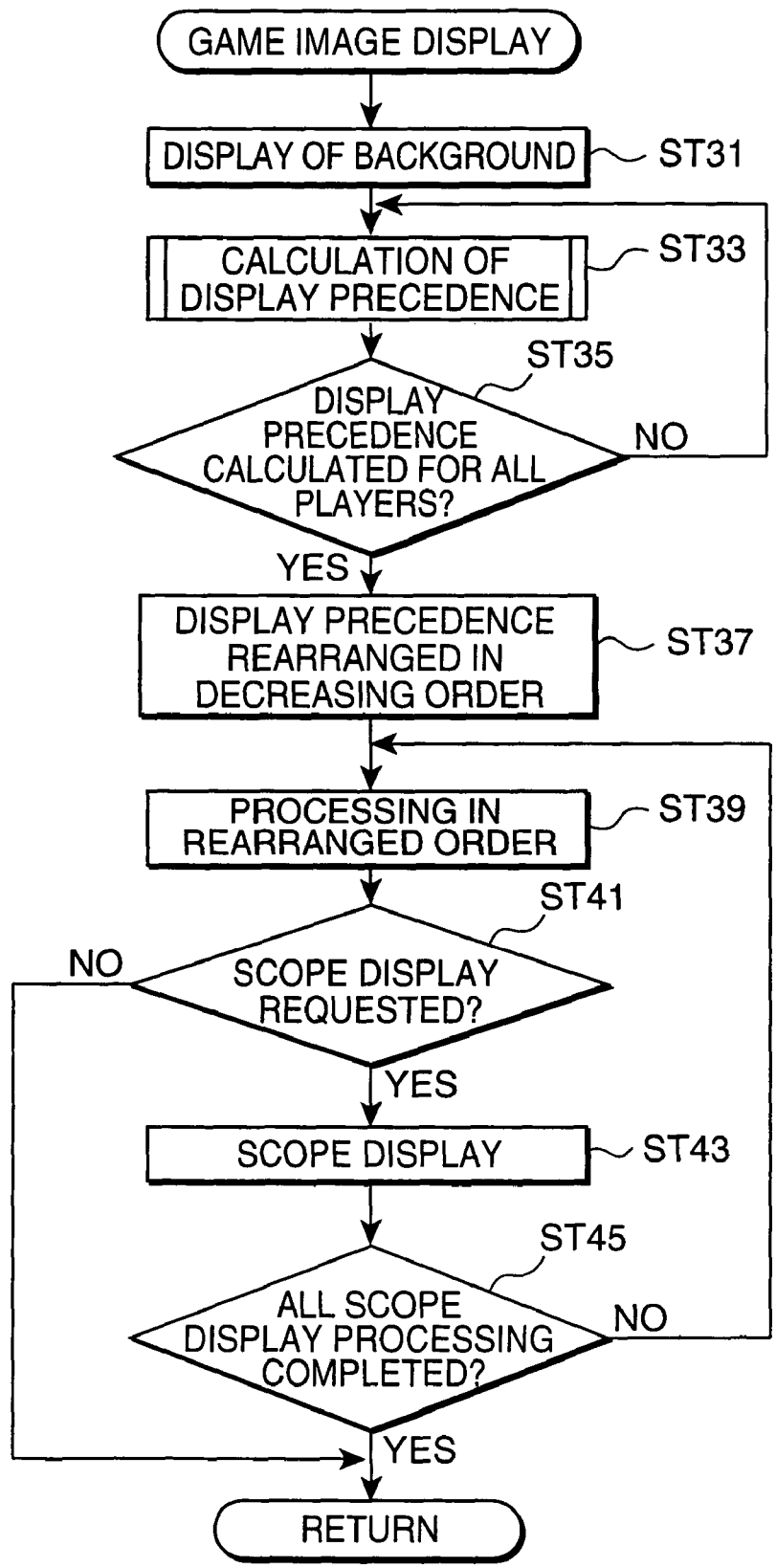
FIG. 9 shows the "game image display" processing subroutine.

FIG. 9 shows the "game image display" processing subroutine of step ST23. First, in FIG. 9, the background image 1031 is displayed, i. e., writing into the display RAM 11a is performed (step ST31). Then, the display precedence is calculated (step ST33). If the calculation of the display precedence has been completed for all of the players (YES in step ST35), rearrangement into the order of decreasing display precedence is performed (step ST37), and processing involving the input of I/O input information and the like is then performed in the rearranged order (step ST39). Then, a judgement is made from the input data as to whether or not there has been a request for scope display (step ST41). In the case of players who have not requested scope display, the processing proceeds to step ST45, while in the case of players who have requested scope display, the preparation of scope marks 1051 and scope images 1052 required for scope display is performed, and these are written into the display RAM 11a (step ST43). Next, a judgement is made as to whether or not all scope display processing has been completed (step ST45); if scope display processing remains, the processing returns to step ST39, and similar processing is performed in order. Then, when all of the scope display processing has been completed, the processing exits this flow.

Figure 10:
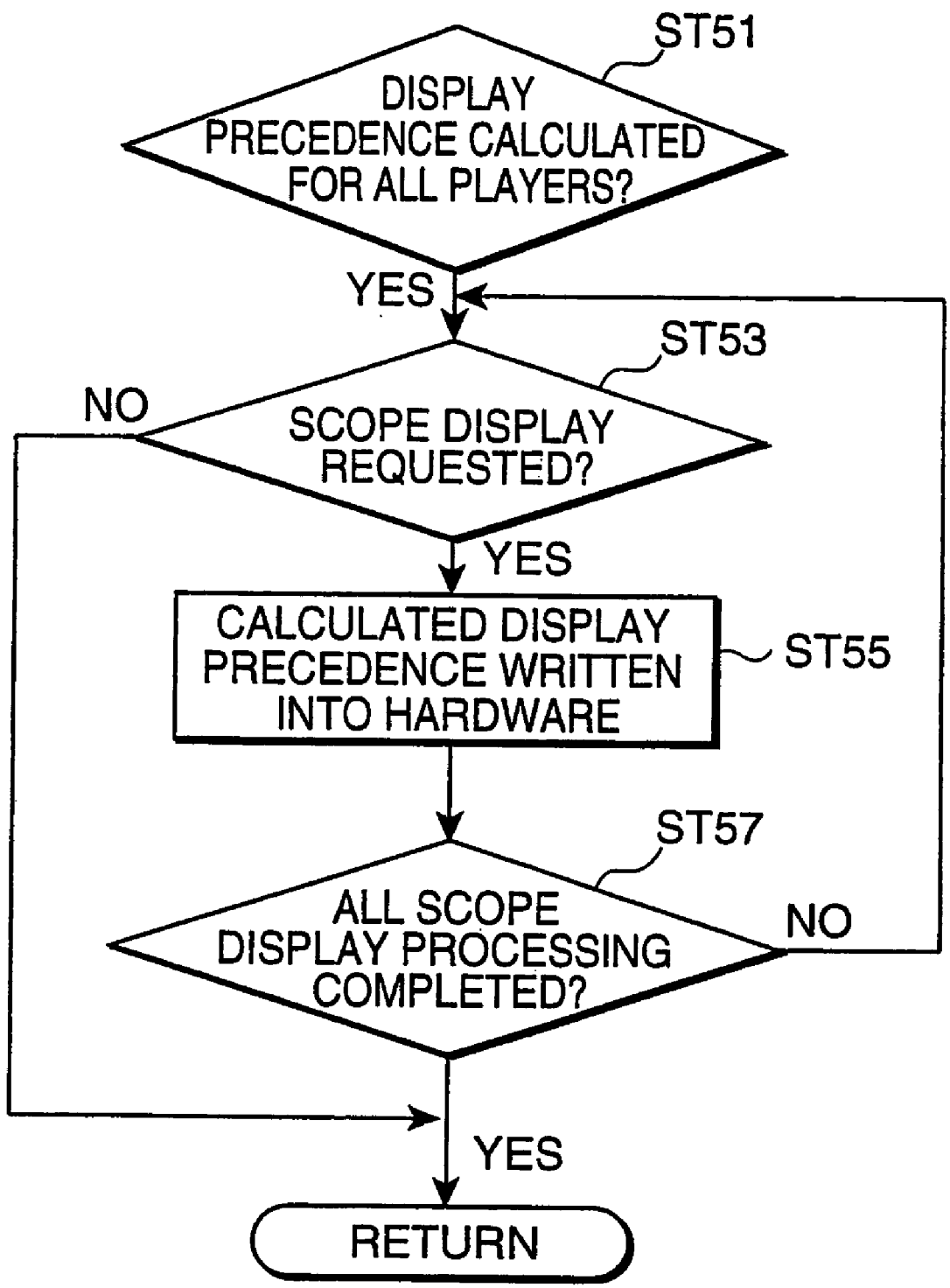
FIG. 10 shows a modification of FIG. 9, and shows a flow chart used in a case where the portion of the construction that writes scope images into the display RAM is constructed by hardware that has a preferential display writing function.

FIG. 10 shows a modification of FIG. 9, and is a flow chart used in a case where the constituent part that writes the scope images into the display RAM 11a is constructed from hardware that has a display precedence drawing function. In this flow chart, after the calculation of the display precedence similar to that of steps ST31 and ST32 has been performed for all of the players (step ST51), a judgment is made as to whether or not there has been a request for scope display (step ST53). In the case of players who have not requested scope display, the processing proceeds to step ST57, while in the case of players who have requested scope display, the information on display precedence obtained by calculation is sent to the hardware and written (step ST55). Next, a judgement is made as to whether or not all of the scope display processing has been completed (step ST57). If scope display processing remains, the processing returns to step ST53, and similar processing is performed in order; then, when all of the scope display processing has been completed, the processing exits this flow.

FIG. 11 shows the "display precedence calculation" processing in step ST33, and FIG. 12 shows screen diagrams used to illustrate the scope display according to the calculation processing shown in FIG. 11. In the flow chart shown in FIG. 11, a memory part that stores n sets of scope coordinates for the respective spot lights obtained in accordance with the imaging period of the infrared camera 40 is provided inside the RAM 130. In step ST61, each time that the most recent scope coordinates are obtained by the imaging operation of the infrared camera 40, these scope coordinates are stored as updated coordinates in place of the oldest scope coordinates. Next, the amount of movement for the number of histories (elapsed time corresponding to n periods of the imaging operation) is calculated from the scope coordinate histories (step ST63).

For example, the amount of movement, i. e., the display precedence, is calculated using the following equation.

$$\text{Display precedence Value } A = [\Sigma_{k=1 \sim n}(|\text{Coordinates of } K\text{th-History} - \text{Coordinates of } (k-1)\text{th-History}|)]/n \quad [\text{Equation 1}]$$

Where "$\Sigma_{k=1 \sim n}$" indicates mathematical notation of summation with k starting with a value 1 and incremented by one until k=value "n".

Equation 1 always focuses on the amounts of movement of the most recent n sets of scope coordinates, and determines the display precedence as a higher display precedence as the overall sum of the amounts of movement is smaller. As a result, the scope mark 1051a of a player Pa who is pointing the imitation gun 30 at a specified position on the screen, e. g., who is aiming at a specified enemy character, as shown in FIG. 12A, can be preferentially displayed as shown in FIG. 12C over the scope mark 1051b of a player Pb (with a large amount of movement) who is viewed as not yet having fixed his aim (this scope mark 1051b having moved to a position that partially overlaps with the scope mark 1051a or that more or less coincides with the scope mark 1051a) as shown in FIG. 12B.

Figure 12A:
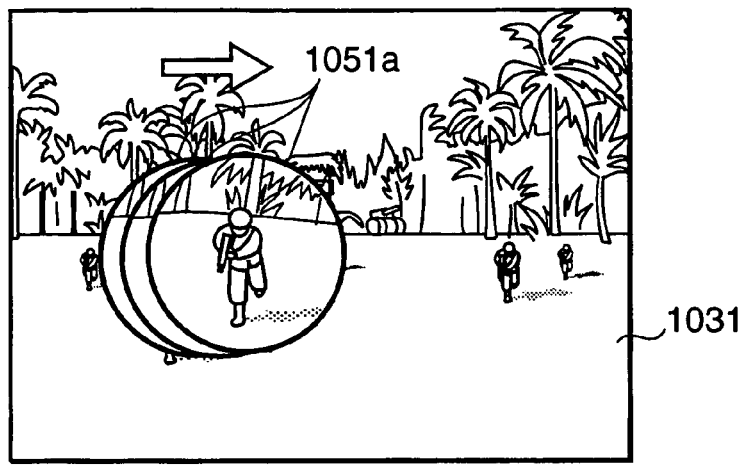
FIG. 12 shows screen diagrams which are used to illustrate the scope displays corresponding to the calculation processing shown in FIG. 11.
Figure 12B:
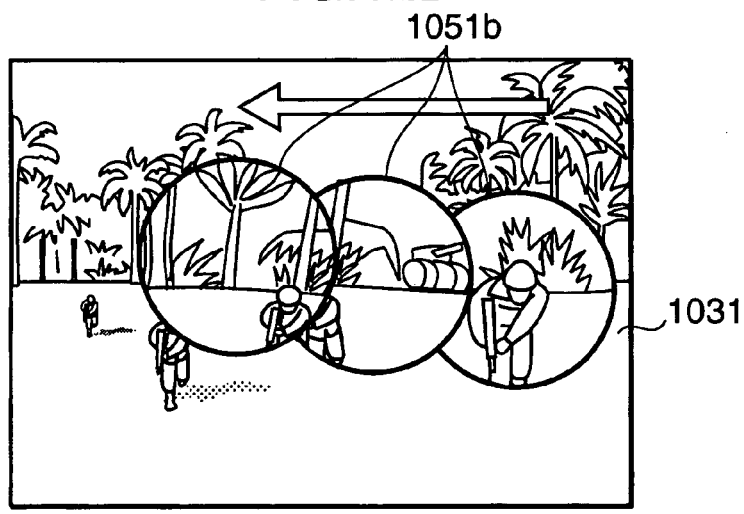
Figure 12C:
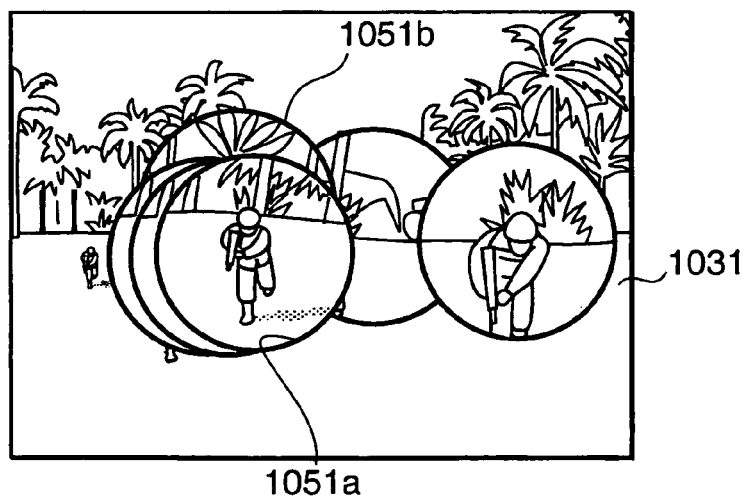

Furthermore, the arrows shown in FIGS. 12A and 12B indicate the direction and magnitude of the movements of the scope coordinates. In actuality, the final single scope image in the direction of each arrow is displayed; here, however, past scope images are also shown for convenience in describing the movement history.

Furthermore, the display precedence setting part 114 may also apply weighting relating to the setting of the display precedence to the most recent movement history among the movement histories that are monitored. In this setting of the display precedence, weighting can be applied the newest (most recent) movement amount by performing calculations as shown in Equation 2.

$$\text{Display Precedence Value } A = (\text{most recent precedence value } A)X(n-1)/n+(|\text{most recent history coordinates} - \text{previous history coordinates}|) \quad [\text{Equation 2}]$$

As a result, a more recent movement history can be applied to the display precedence, i. e., the response (reaction) speed for the display precedence can be increased, as the movement history is more recent. Furthermore, the method used to apply weighting to the mores recent amount of movement is not limited to Equation 2; the system may also be devised so that specified separate weighting coefficients are applied (weighting is applied) to a plurality of the most recent calculated amounts of movement.

Figure 13:
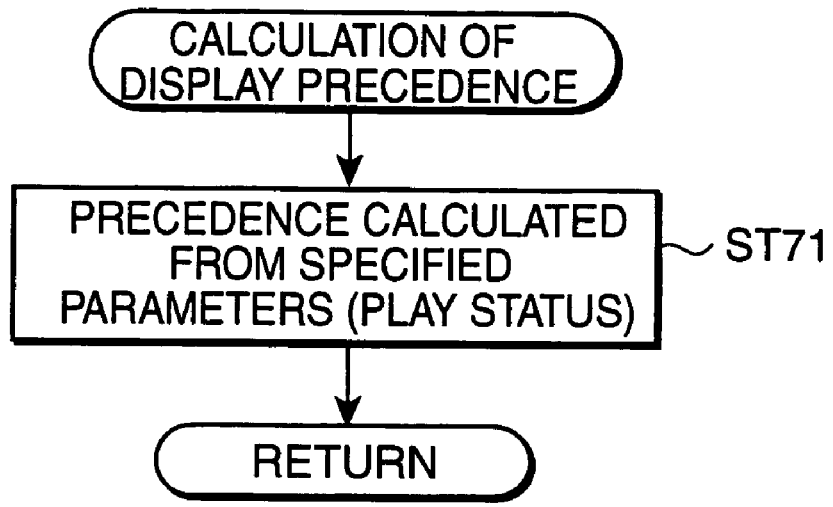
FIG. 13 shows a subroutine which illustrates another embodiment of the calculation of the display precedence.

FIG. 13 shows a subroutine which illustrates another embodiment of the calculation of the display precedence. In FIG. 13, for example, the display precedence corresponding to the evaluation of the play is calculated from specified parameters (step ST71). The number of killed enemy characters (e. g., the score), or the remaining life of the players, can be used as the abovementioned specified parameters. Specifically, the scope images of players who have killed larger numbers of enemy characters (players with a higher score) or players with a larger remaining life value, are preferentially displayed.

Figure 14:
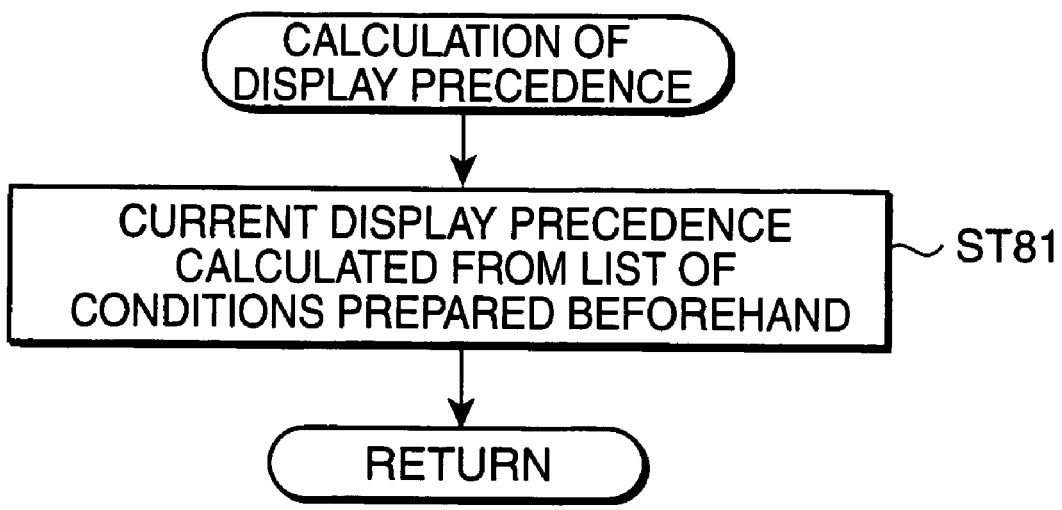
FIG. 14 shows a subroutine which illustrates still another embodiment of the calculation of the display precedence.

FIG. 14 shows a subroutine which illustrates still another embodiment of the calculation of the display precedence. In FIG. 14, the current display precedence is calculated from a list of preset conditions (step S81). For example, a configuration in which a specified order is set for the four players (four imitation guns 30) in each scene of the stage, a configuration in which players (imitation guns 30) that have specified items are given preference, or a configuration in which the display precedence is set beforehand in accordance with the elapsed time of the game, is conceivable as the abovementioned list of conditions. Alternatively, these configurations may be appropriately combined. For example, the system may be devised so that the game progression processing part 102 causes various items to appear (i. e., to be displayed on the display part 11) in an irregular manner during the progression of the game, and these items are characteristically applied to (associated with) players whose shooting has scored hits on these items. Furthermore, the system may also be devised so that the game progression processing part 102 increases the performance of the imitation guns 30 of the players endowed with these items, e. g., so that the game progression processing part 102 increases the performance in accordance with the respective items by increasing the destructive force of the guns, increasing the amount of ammunition that is loaded in the guns, increasing the size of the frame of the scope mark 1051, or increasing the display magnification. Specifically, relative variability with respect to the difficulty of the game play can be introduced in accordance with item acquisition, thus making a more interesting game.

Furthermore, as still another embodiment of the calculation of the display precedence, the actions of the players may be considered. In this case, the display precedence is set in accordance with the actions of the players detected by the player action detection part 113. For example, in cases where a player has placed both the ocular sensor 35 and the shoulder sensor 36 of the imitation gun in an "on" state, i. e., in cases where this player is holding the imitation gun 30 in the attitude shown in FIG. 2C, it is judged that this player has fixed his aim on a specified target while closely observing the scope image, and the display precedence setting part 114 sets the display precedence of the scope image corresponding to this imitation gun at a high value. Furthermore, for example, in cases where a player has placed the ocular sensor 35 of his imitation gun in an "off" state, i. e., in cases where this player is holding the imitation gun 30 in the attitude shown in FIG. 2D, it is judged that the player has not fixed his aim on a specified target, and does not consider the scope image to be important; accordingly, the display precedence setting part 114 sets a lower display precedence for the scope image corresponding to this imitation gun than the precedence that is set when both the ocular sensor 35 and shoulder sensor 36 are in an "on" state. Furthermore, for example, in cases where a player has placed both the ocular sensor 35 and shoulder sensor 36 of his imitation gun 30 in an "off" state, it is judged that the player has not yet held the imitation gun 30 in an aiming attitude, and the display precedence setting part 114 sets the lowest display precedence for the scope image corresponding to this imitation gun.

Furthermore, the display precedence setting part 114 can also set a precedence that is a composite of respective precedence values set on the basis of information obtained from the movement status evaluation part, game progression status judgement part and player action detection part. Furthermore, the precedence among the respective precedence values may be arbitrarily set.

FIGS. 15 through 20 are diagrams which are used to illustrate still another embodiment relating to the preferential display of scope images in the display precedence setting part 114 and scope image display processing part 105. In this embodiment, the game progression processing part 102, scope image display processing part 105 and display precedence setting part 114 shown in FIG. 3 also have the following functions.

Specifically, the game progression processing part 102 performs a function that outputs data indicating the number of depressed start buttons 23, i. e., the number of participants m, to the control part 100. Furthermore, the scope image display processing part 105 performs display processing of scope images corresponding to the respective imitation guns 30, forms and displays scope marks constituting circular display frames that have a diameter (scope size s) that will be described later in some regions of the display screen of the background image, prepares scope images which are images that are enlarged by a specified magnification with respect to the background image inside the abovementioned frames, and writes and displays these scope images.

The display precedence setting part 114 makes a judgement as to whether the mutual relationships of the arrival coordinates of the spot lights on the screen of the display part 11 are within a specified (first) proximity range, or within a second proximity range in which the display frames are in such close proximity that at least portions of the display frames overlap. Outside the first proximity range, the display precedence setting part 114 sets an ordinary size as the size of the display frame (scope image); on the other hand, within the first to second range, the display precedence setting part 114 sets a specified size that is smaller than the ordinary size in accordance with the abovementioned display precedence, and within the second proximity range, the display precedence setting part 114 causes a display to be performed in accordance with the display precedence as in the abovementioned embodiment. Specifically, the scope image display processing part 105 calculates and sets the diameter of the scope mark 1051 as a scope size s that is smaller than the ordinary size, so that the probability of the scope marks 1051 corresponding to the respective imitation guns 30 overlapping as a result of the respective guns 30 pointing to proximate positions within the screen is reduced. For example, in FIG. 6, FIG. 6A shows a state in which two scope marks 1051 are separated to the left and right, FIG. 6B shows a state in which the right-side scope mark 1051 has moved to the left side, and FIG. 6C shows a state in which the right-side scope mark 1051 has covered the scope image 1052 inside the left-side scope mark 1051 which has remained stationary on the original left side aiming at an enemy character AM1, so that this right-side scope mark 1051 impedes shooting.

In this case, the overlapping of the right-side scope mark 1051 and left-side scope mark 1051 can be avoided, or this overlapping can be reduced, by reducing the diameter of the scope marks 1051. However, in cases where the diameter of the scope marks 1051 is unconditionally reduced, the display of the scope images 1052 inside the scope marks 1051 is reduced in size; as a result, there is a danger that the ease with which the scope images can be seen by the players will be impaired. Accordingly, the system is devised so that the scope image display processing part 105 calculates and sets the scope size s according to a specified rule in cases where two or more scope marks 1051 are displayed. The number of participants m or the distance between the scope marks 1051 may be utilized as judgement elements in this rule. In cases where the number of participants m is utilized as a judgement element, the display precedence may be set in accordance with the number of persons so that the size becomes successively smaller; alternatively, a configuration may be used in which the size is altered as described above (using first and second proximity ranges) in accordance with the mutual relationships of the respective positions within respective numbers of persons.

From data expressing the number of participants m obtained by the game progression processing part 102, the scope image display processing part 105 sets the scope size s in stages in accordance with the number of participants m, so that this size in increased in cases where the number of participants m is small, and reduced in cases where the number of participants m is large. For example, the correspondence between the number of participants m and the scope size s is stored beforehand in an LUT (look-up table) memory, and the scope image display processing part 105 determines and sets the scope size s from the number of participants m by referring to this LUT.

Furthermore, for example, a construction may be used in which the scope size s in a case where the scope size s is the maximum scope size, i. e., a case in which the number of participants m is 1, is stored in memory beforehand as the maximum scope size $s_{max}$, and the scope size is calculated as $$s = s_{max}/m$$

Furthermore, for example, a construction may be used in which the minimum scope size s required in order for the players to recognize the scope images 1052 and play the game is stored in memory beforehand as the minimum scope size $s_{min}$, and the scope size s is set at the minimum scope size $s_{min}$ regardless of the number of participants m in cases where the scope size s obtained by the scope image display processing part 105 falls below the minimum scope size $s_{min}$. As a result, in cases where the number of participants is large, the scope size s is set at a small size by the scope image display processing part 105. Furthermore, since scope marks 1051 whose diameters have the abovementioned set scope size s are displayed by the scope image display processing part 105, and since the scope images 1052 are written as overwriting and displayed inside these scope marks 1051, the scope images 1052 are displayed with a small size. Accordingly, there is little overlapping display of scope images 1052.

On the other hand, in cases where the number of participants m is small, the scope size s is set at a large value by the display precedence setting part 114. Furthermore, since the scope marks 1051 are set at a large size by the scope image display processing part 105, and since the scope images 1052 are written as overwriting and displayed inside the scope marks 1051, the scope images 1052 are displayed with a large size. Accordingly, the scope images 1052 are displayed so that these images can easily be seen by the players.

Furthermore, in cases where the scope size s is set in accordance with the distance between the respective scope marks 1051, the scope image display processing part 105 calculates the distances between the respective scope marks 1051 from the coordinates of the respective spot lights obtained by the infrared camera 40, i. e., the coordinates of the positions at which the centers of the respective scope marks 1051 are displayed, and determines the shortest distance among these calculated distances as the minimum distance $l_{min}$. Furthermore, the scope image display processing part 105 may also have a construction in which the distance at which the diameters of the scope marks 1051 are displayed as the smallest values, i. e., the distance at which the minimum scope size $s_{min}$ is set as the scope size s, is stored beforehand in memory as the shortest distance of scope size variation M, and the scope size s is calculated from the minimum scope size $s_{min}$, minimum distance $l_{min}$ and shortest distance of scope size variation M using the following calculation formula:

$$s = s_{min} \times (l_{min}/M)$$

Furthermore, a construction may also be used in which the average value of the abovementioned calculated distances between the respective scope marks 1051 is determined as the average distance $l_{ave}$ instead of the minimum distance $l_{min}$, and the scope size s is calculated as $$s = s_{min} \times (l_{ave}/M)$$

from the minimum scope size $s_{min}$, average distance $l_{ave}$ and shortest distance of scope size variation M.

Furthermore, the scope image display processing part 105 may also have a construction that calculates the scope size s using both the number of participants m and the distances between the respective scope marks 1051.

FIG. 15 shows another subroutine of the "game image display" processing of step ST23. In FIG. 15, processing of the display of the background image 1031, i. e., writing into the display RAM 11a, is first performed (step ST131). Then, the calculation and setting of the scope size s are performed (step ST133). Then, processing such as the input of I/O input information and the like is performed, and a judgement is made from the input data as to whether or not there is a request for scope display (step ST135). In the case of players who have not requested scope display, the processing proceeds to step ST39; in the case of players who have requested scope display, scope marks 1051 and scope images 1052 used for scope display are prepared so that the image size has the diameter of the abovementioned set scope size s, and this data is written as overwriting into the display RAM 11a (step ST137). Next, a judgement is made as to whether or not all of the scope display processing has been completed (step ST139), and if processing remains, the subroutine returns to step ST135, and similar processing is performed in order. When all of the scope display processing has been completed, the processing exits this flow.

FIG. 16 shows the subroutine of the "scope size s calculation and setting" processing in step ST133. In FIG. 16, the number of participants m obtained by the game progression processing part 102 is first acquired by the scope image display processing part 105 (step ST141), and a size corresponding to the acquired number of participants m is set as the scope size s in the abovementioned LUT by the display precedence setting part 114 (step ST143). As a result, a large value is set as the scope size s in cases where the number of participants m is small, and a small value is set as the scope size s in cases where the number of participants m is large. Then, the processing returns.

Figure 17A:
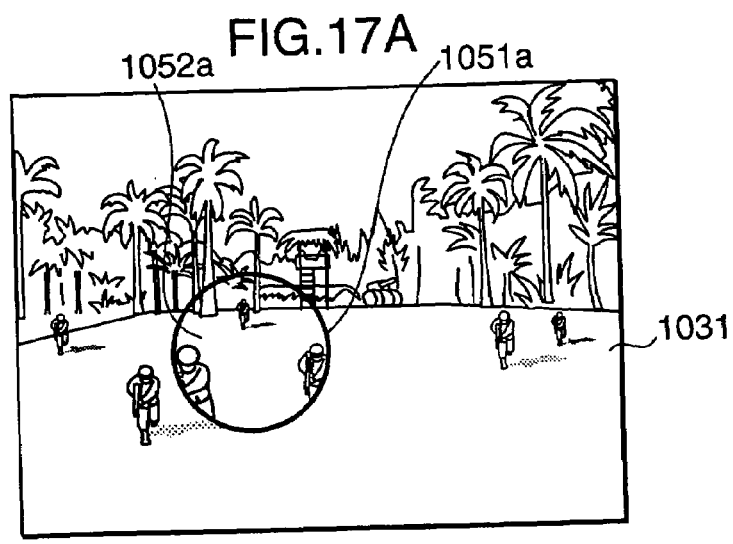
FIG. 17 shows screen diagrams which are used to illustrate the scope displays in a case where the scope size s is set in accordance with the number of participants m, with FIG. 17A showing the display conditions of the scope mark and scope image in a case where the number of participants m is 1, FIG. 17B showing the display conditions of the scope marks and scope images in a case where the number of participants m is 2, and FIG. 17C showing the display conditions of the scope marks and scope images in a case where the number of participants m is 3.
Figure 17B:
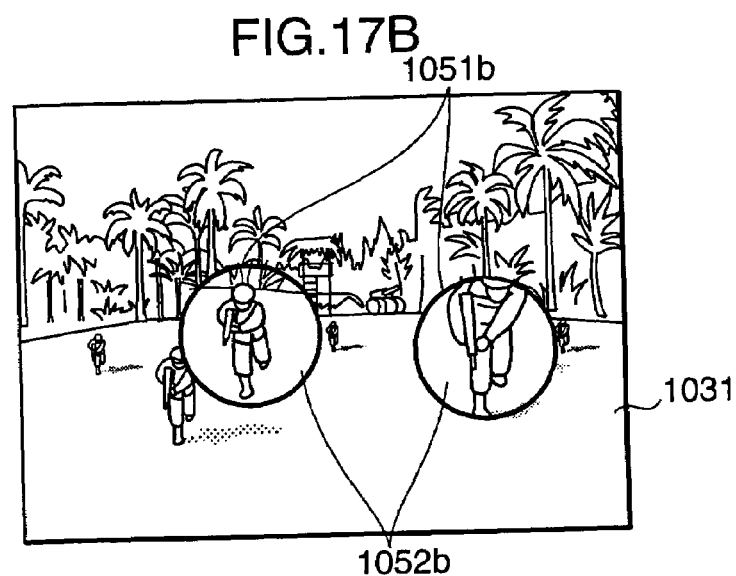
Figure 17C:
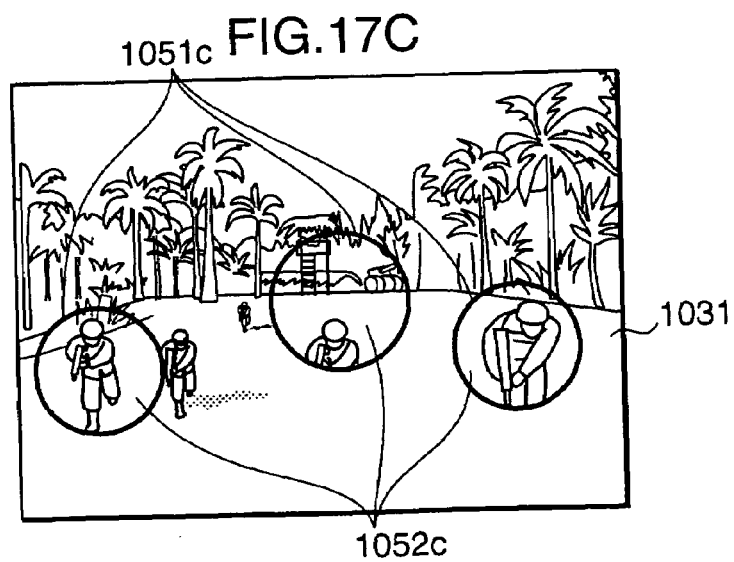

FIG. 17 shows screen diagrams used to illustrate the scope display in cases where the scope size s is set in accordance with the number of participants m. FIG. 17A shows the display of the scope mark 1051a and scope image 1052a in a case where the number of participants m is 1, FIG. 17B shows the display of the scope marks 1051b and scope images 1052b in a case where the number of participants m is 2, and FIG. 17C shows the display of the scope marks 1051c and scope images 1052c in a case where the number of participants m is 3.

In FIG. 17B, since the number of participants m is greater than in the case of FIG. 17A, the scope size s is set at a smaller value than in the case of FIG. 17A; accordingly, the scope marks 1051b are displayed with a smaller diameter than the scope mark 1051a. As a result, in FIG. 17B, the two scope marks 1051b and scope images 1052b are displayed with a smaller size than in a case where the two scope marks 1051b are displayed with the same diameter as the scope mark 1051a regardless of the number of participants m. Accordingly, there is little possibility that the images will overlap with each other. Similarly, in FIG. 17C, the three scope marks 1051c and scope images 1052c are displayed with a smaller size than in a case where the three scope marks 1051b are displayed with the same diameter as the scope mark 1051a; accordingly, there is little possibility that the images will overlap with each other.

Figure 18:
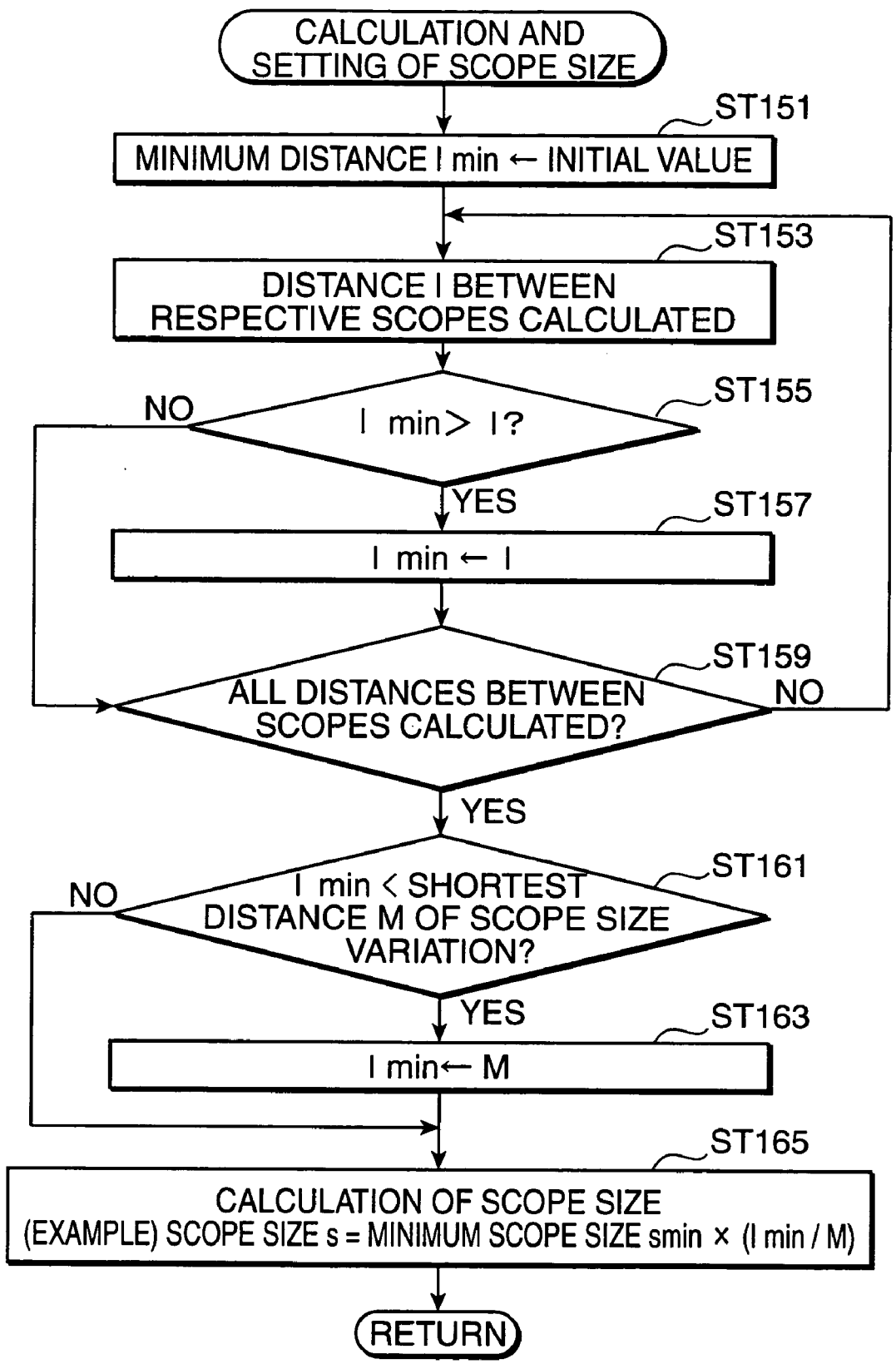
FIG. 18 shows still another embodiment of the "scope size s calculation and settings" processing in step ST133.

FIG. 18 shows a subroutine which illustrates still another embodiment of the "scope size s calculation and setting" processing in step ST133. First, in step ST151, a sufficiently large numerical value, e. g., a numerical value indicating the length of the diagonal line of the display part 11, is substituted for the minimum distance $l_{min}$, which is the variable used to accommodate the minimum distance among the distances between the respective scope marks 1051, so that the minimum distance $l_{min}$ is initialized, by the scope image display processing part 105.

Next, the distance l between a certain scope mark 1051 and another scope mark 1051 is calculated by the scope image display processing part 105 from the coordinates of the respective spot lights obtained by the infrared camera 40, i. e., the coordinates of the positions where the centers of the respective scope marks 1051 are displayed (step ST153), and the minimum distance $l_{min}$ and distance l are compared (step ST155). In cases where the minimum distance $l_{min}$ is smaller than the distance l, the processing proceeds to step ST159; on the other hand, in cases where the minimum distance $l_{min}$ is greater than the distance l, the distance l is substituted for the minimum distance $l_{min}$ (step ST157), and the processing proceeds to step ST159.

Next, a check is made by the scope image display processing part 105 as to whether or not distances have been calculated between each scope mark 1051 and all of the other scope marks 1051 for all of the scope marks 1051 displayed (step ST159). If distances remain to be calculated, the processing returns to step ST153, and the processing of steps ST153 through ST159 is performed for the new distances between scope marks 1051. If distances between all of the scope marks 1051 have been calculated, the processing returns to step ST161. As a result, the shortest distance among the distances between the respective scope marks 1051 is determined as the minimum distance $l_{min}$.

Next, the minimum distance $l_{min}$ and the shortest distance of scope size variation M are compared by the scope image display processing part 105 (step ST161). In cases where the minimum distance $l_{min}$ is greater than the shortest distance of scope size variation M, the processing proceeds to step ST165; on the other hand, in cases where the minimum distance $l_{min}$ is smaller than the shortest distance of scope size variation M, the shortest distance of scope size variation M is substituted for the minimum distance $l_{min}$ (step ST163), and the processing proceeds to step ST165. Since the minimum distance $l_{min}$ corresponds to the minimum scope size $s_{min}$, the scope size s can be prevented from becoming smaller than the minimum scope size $s_{min}$ by the processing of step ST161 and step ST163.

Next, in step ST165, the scope size s is calculated and set by the scope image display processing part 105 from the minimum scope size $s_{min}$, minimum distance $l_{min}$ and shortest distance of scope size variation M using the calculation formula $$s = s_{min} \times (l_{min}/M),$$

the "scope size s calculation and setting" processing is completed, and the processing returns.

Figure 19A:
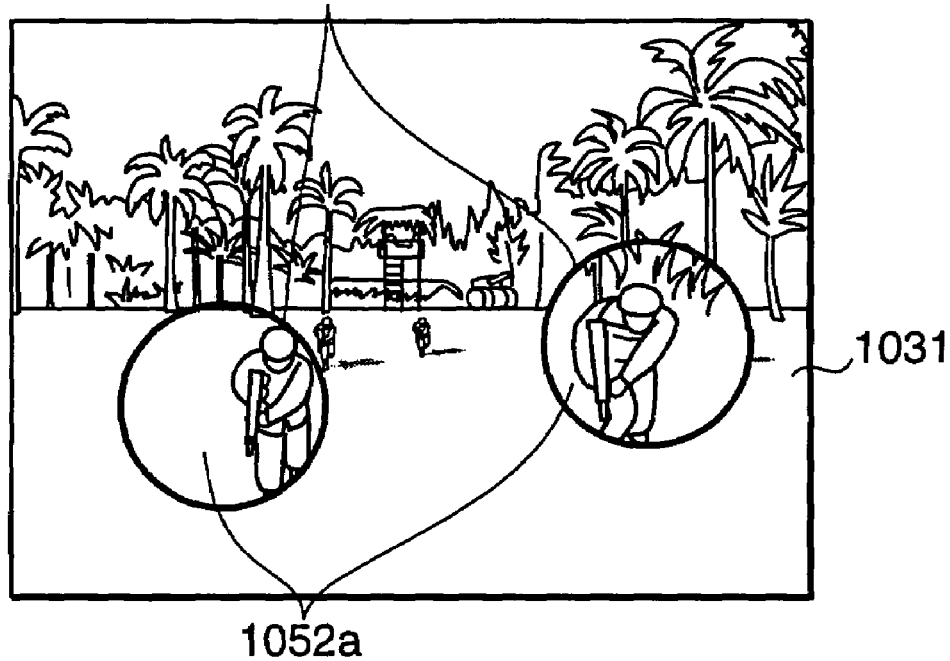
FIG. 19 shows screen diagrams which are used to illustrate the scope displays in a case where the scope size s is set in accordance with the distance between the scope marks, with FIG. 19A showing the display conditions of the scope marks and scope images in a case where the distance between two scope marks that are displayed is large, and FIG. 19B showing the display conditions of the scope marks and scope images in a case where the distance between two scope marks that are displayed is small.
Figure 19B:
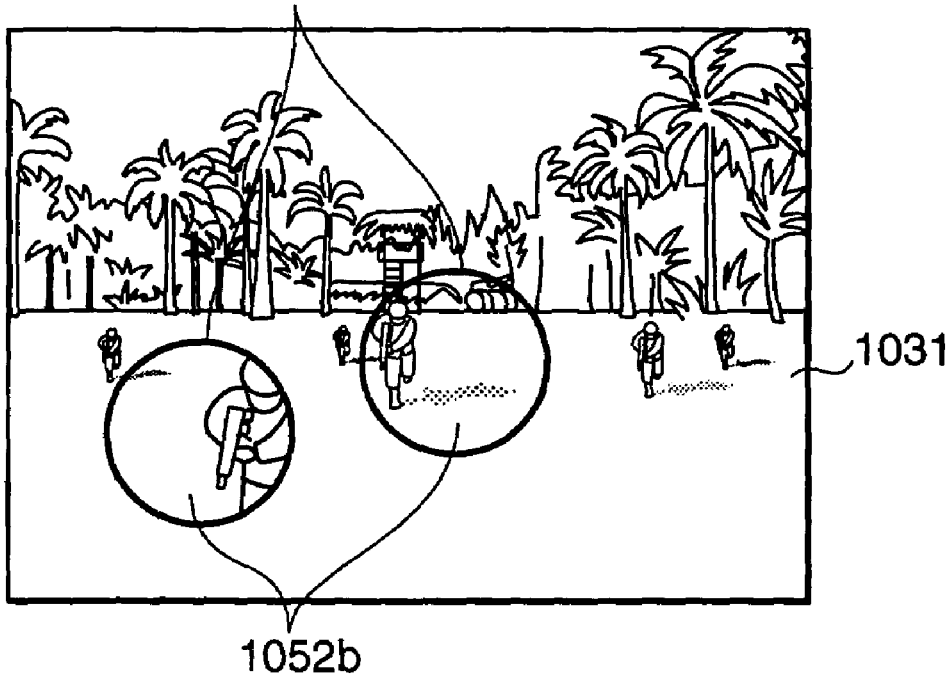

FIG. 19 shows screen diagrams used to illustrate the scope display in cases where the scope size s is set in accordance with the distance between the scope marks 1051. FIG. 19A shows the display of the scope marks 1051a and scope images 1052a in a case where the distance between two displayed scope marks 1051a is large, and FIG. 19B shows the display of the scope marks 1051b and scope images 1052b in a case where the distance between two displayed scope marks 1051b is small.

In FIG. 19B, since the distance between the scope marks is smaller than in the case of FIG. 19A, the scope size s is set at a smaller value than in the case of FIG. 19A; accordingly, the scope marks 1051b are displayed with a smaller diameter than the scope marks 1051a. As a result, although the scope marks 1051b would overlap with each other if the scope marks 1051b in FIG. 19B were displayed with the same diameter as the scope marks 1051a, there is no overlapping of the respective scope marks 1051b or scope images 1052b in FIG. 19B, since the scope marks 1051b and scope images 1052b are displayed with a smaller diameter in accordance with the inter-scope distance.

Figure 20:
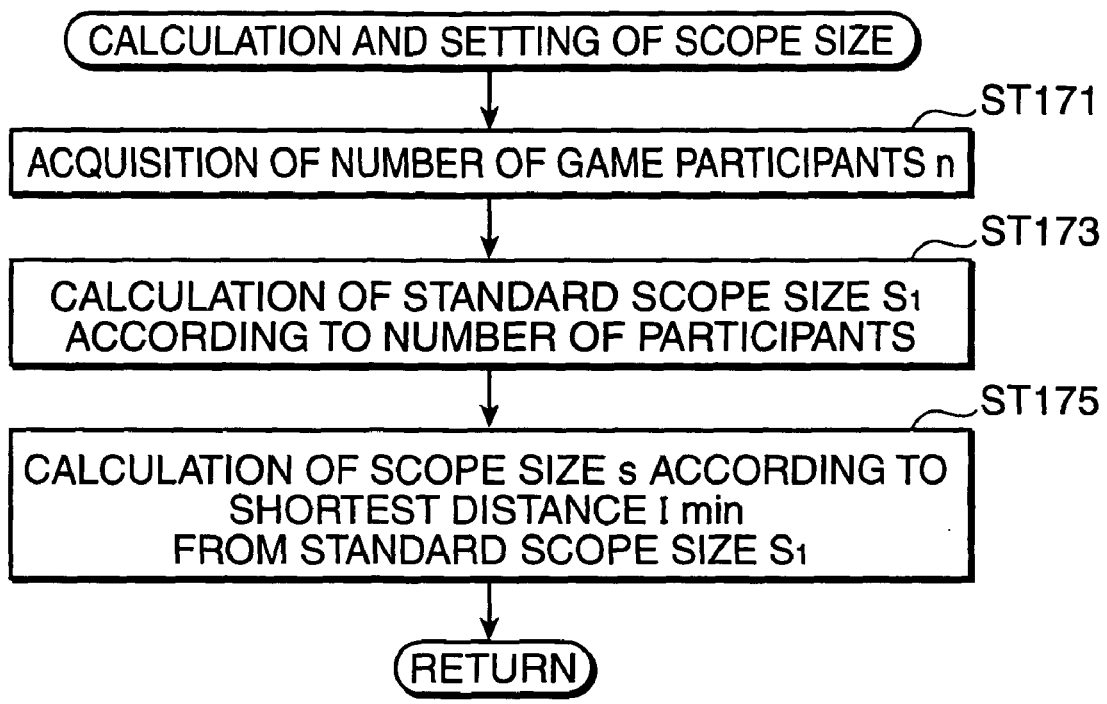
FIG. 20 shows a subroutine which illustrates still another embodiment of the "scope size s calculation and setting" processing in step ST133.

FIG. 20 shows a subroutine which illustrates still another embodiment of the "scope size s calculation and setting" processing in step ST133. In FIG. 20, the number of participants m obtained by the game progression processing part 102 is first acquired by the scope image display processing part 105 (step ST171), and a size corresponding to this acquired number of participants m is set by the scope image display processing part 105 as the standard scope size $s_1$ in the abovementioned LUT (step ST173). As a result, a large value is set as the standard scope size $s_1$ in cases where the number of participants m is small, and a small value is set as the standard scope size $s_1$ in cases where the number of participants m is large.

Next, in step ST175, the minimum distance $l_{min}$ is calculated by the scope image display processing part 105 using the same processing as in steps ST151 through ST163, and the scope size s is calculated and set from the minimum scope size $s_{min}$, maximum scope size $s_{max}$ standard scope size $s_1$, minimum distance $l_{min}$ and shortest distance of scope size variation M using the following calculation formula:

$$s = s_{min} \times (l_{min}/M) \times (s_1/s_{max})$$

Then, the "scope size s calculation and setting" processing is completed.

Furthermore, the scope image display processing part 105 may also set the scope size s in association with the display precedence setting part 114. In this case, the scope image display processing part 105 refers to the display precedence calculated and set by the display precedence setting part 114 using the abovementioned method, and sets the scope size s at a relatively large value in the case of a high display precedence, and at a relatively small value in the case of a slow display precedence.

Furthermore, it is also desirable to take into account the positional relationships (distances) between displayed scope marks in the setting of the scope size s in association with the display precedence setting part 114. For example, in cases where scope images are close to each other, processing which reduces the scope size s of the scope image with a lower precedence is performed. Furthermore, in this case as well, the scope image display processing part 105 displays scope images based on the precedence set by the display precedence setting part 114 when scope images overlap with each other.

Figure 21A:
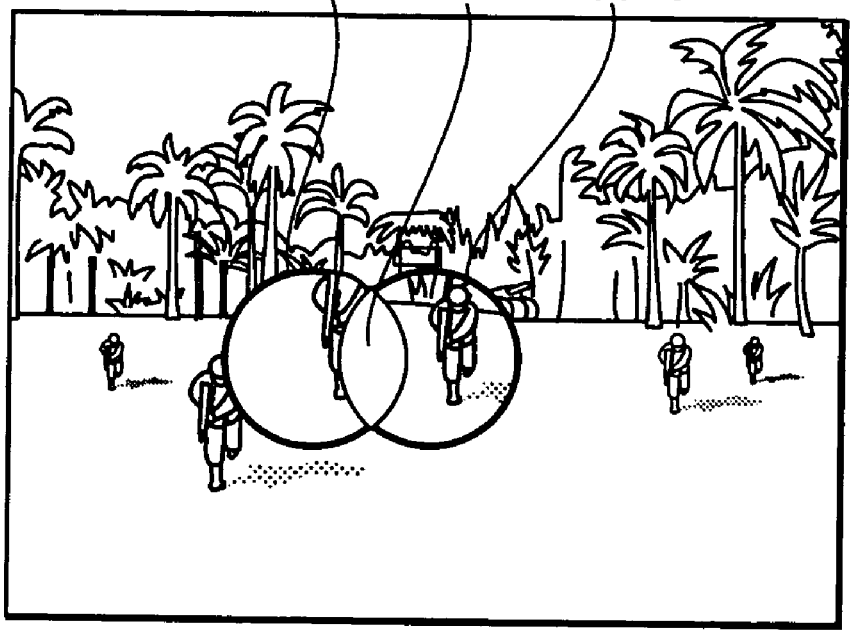
FIG. 21 is a diagram which shows display conditions in which the mutually overlapping regions are uniformly divided in a case where the scope images of two players overlap.
Figure 21B:
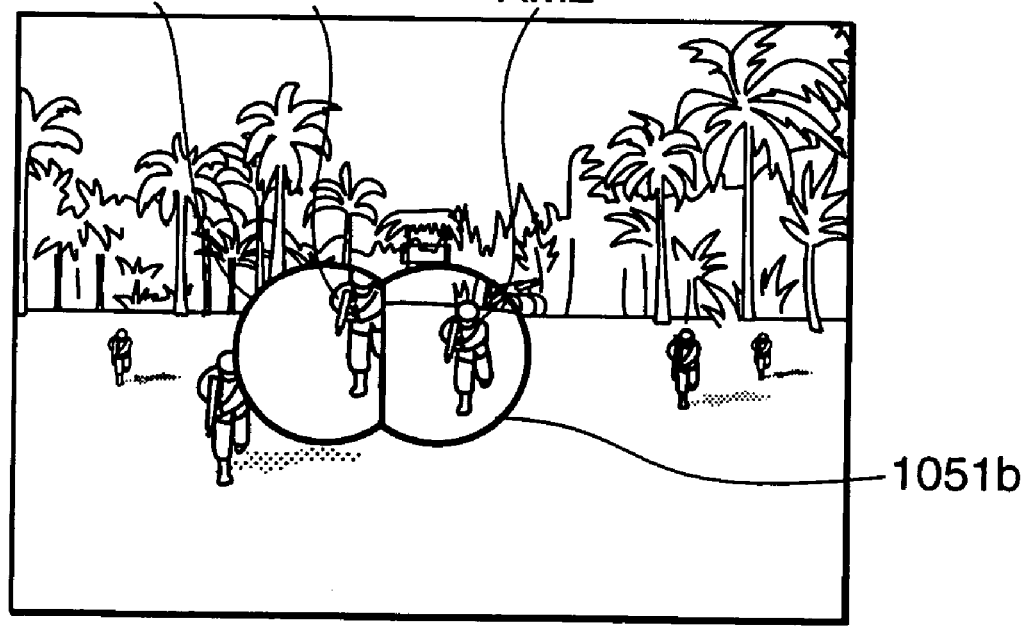

Furthermore, FIG. 21 shows diagrams that illustrate the display conditions in a case where the mutually overlapping regions are uniformly divided when the scope images 1051 of two players overlap. In this case, an enemy character AM1 is displayed in the scope image 1051a, and an enemy character AM2 is displayed in the scope image 1051b. As is shown in FIG. 21A, instead of using a method in which the portion 1053 where both scopes overlap is preferentially assigned to one scope or the other, processing is performed which respectively divides this portion along a line segment connecting the intersection points of the scope mark 1051a and scope mark 1051b (FIG. 21B). If this is done, the divided portions are always equal; accordingly, neither player has a display precedence, and the problem of one player suffering from a disadvantage is ameliorated.

Furthermore, the present invention may also use the following modified configurations.

(1) A desirable condition for scope display was set as a simultaneous "on state" of both the ocular sensor 35 and shoulder sensor 36. However, the present invention is not limited to this; it would also be possible to provide a scope display when only one sensor, e. g., the ocular sensor 35, is "on", or to use a configuration in which a scope display is provided during the game without conditions.

(2) The present invention was described as a shooting game. However, the present invention is not limited to this; the present invention can be applied to games which are devised so that when appropriate locations on the screen on which the background image is displayed are designated by position designating means, e. g., a plurality of controllers or the like, images of partial regions including these portions are enlarged and displayed, and the game progresses by thus making the background image observable in greater detail.

(3) In the present embodiment, since infrared light is used for position designation, the shooting positions on the screen cannot be directly observed. However, it would also be possible to utilize image processing so that shooting markers are displayed in the detected positions of the spot lights. Alternatively, it would also be possible to use a mode in which positions are designated using visible light in a configuration in which the present game apparatus is installed inside a building.

(4) The synchronization processing part 108 is not limited to a phase shifting system; some other method may be used. For example, the four laser light emitters 32 may be assigned individual codes consisting of specified bits, and the light emission can be periodically controlled using these individual codes. For example, if these emitters are defined using 4-bit individual codes, then four types of codes can be prepared by setting the initial and final bits as "high" bits, and realizing the second and third bits as either "high" or "low" bits. If this is done, then the respective spot lights can be displayed in a manner that allows discrimination by causing one bit of light emission to correspond to the imaging period (if there are six imaging periods before and after).

(5) The number of imitation guns is not limited to four; it is sufficient if there are two or more guns.

(6) The method used to create the enlarged images is not limited to the abovementioned embodiment. For example, the scope image display processing part 105 may be devised so that scope marks 1051 are set (e. g., in the center) using the coordinates of the spot lights at the points in time at which trigger "on" signals are generated as a reference, and processing is performed so that images of specified regions center on these spot lights that are drawn within these scope marks 1051, i. e., images that converted into distances that correspond to a preset display magnification as a scope function, are applied as overwriting or underwriting within the scope marks 1051, i. e., to the display RAM 11a, by reading out required image data from the ROM 120 and re-executing image drawing processing (for example, if the display magnification rate is set at 5× in the case of an enemy character AM1 (FIG. 4A) that is separated by a distance of 100 m from the virtual camera viewpoint that creates the background image within the game space, then a display image of this enemy character AM1 (FIG. 4B) is created so that it appears as though the character is in a position that is separated from the virtual camera viewpoint by a distance of 20 m). Alternatively, the images used as enlarged images may be prepared beforehand, and processing that pastes appropriate corresponding images in accordance with the designated positions may be performed.

(7) As another embodiment of the position designating means, a method may be used in which markers with a configuration having respective length information for two axial directions are provided on the side of the imitation guns 30 or on the side of the main body housing part 10, these markers are imaged by a camera installed on the other side, and the position designating means calculate which positions on the screen of the display part 11 are designated from the imaging conditions on the side of the acquired images. Alternatively, a method in which the imitation guns are directly imaged by a CCD camera, and the positions and orientations of the imitation guns 30 and (from such information) the aiming positions on the screen of the display part 11 are calculated from the acquired images, or (as a simpler configuration) a method in which specified position-specifying marks within the screen (these may be point-form marks) or similar position-specifying marks outside the screen, are displayed by disposition or light emission, these marks are imaged by position designating means, e. g., CCD cameras installed in the gun muzzles on the side of the imitation guns 30, and the pointing (designation) directions of the imitation guns 30 are detected from positional information for the mark images within the acquired images, may also be used. Thus, the position designating means include configurations constructed from a combination of a member that indicates positions and a member that detects these positions, and configurations that perform detection only on one side, as in the case of a CCD camera or ultrasonic transmitter-receiver.

(8) Here, the principle of the method described in (7), in which markers with a configuration having respective length information for two axial directions are provided on the side of the imitation guns 30 or on the side of the main body housing part 10, these markers are imaged by a camera installed on the other side, and the position designating means calculate which positions on the screen of the display part 11 are designated from the imaging conditions on the side of the acquired images, will be described.

In the position designating means used in this method, one or a specified number of so-called L-shaped markers are displayed in specified positions on the display screen of the display part 11, preferably all at equal intervals with two markers being disposed in the vertical direction and three markers being disposed in the horizontal direction (or the reverse of this arrangement), and with one marker being disposed in common at the position of the vertical-horizontal intersection point. Alternatively, one or a specified number of markers comprising L-shaped point-form light sources (e. g., LEDs) with the same shape as that described above are disposed in specified positions in peripheral locations on the display part 11. Meanwhile, imaging devices such as CCD cameras or the like are mounted in the gun muzzles of the imitation guns 30. Furthermore, in this method, the abovementioned L-shaped markers are imaged by the CCD cameras, and the positions on the screen of the display part 11 that are pointed at by the gun muzzles are calculated from the imaging conditions of the respective point images with the images that are acquired in this case. Specifically, the position designating means further comprise means that calculate the orientations of the CCD cameras, i. e., the line-of-sight vectors of the gun muzzles, on the basis of information on the dimensions in the axial direction for the positions, amounts of rotation and inclinations of the acquired marker images, and means that calculated the points of intersection of the calculated line-of-sight vectors with the screen of the display part 11. By using such a construction, it is possible to calculate the points of intersection of the gun muzzles, i. e., the line-of-sight vectors, with the screen (i. e., the designated positions) from the rotation of the L-shaped markers within the acquired images, and the distances between the respective point images, in accordance with the rotation and inclination of the imitation guns 30 relative to the screen (Japanese Patent Application No. 2001-242819).

Furthermore, the positions on the screen pointed at by the gun muzzles can be calculated from the images acquired by the CCD cameras even in the case of a positional relationship that is the opposite of that described above, i. e., a relationship in which the abovementioned L-shaped markers comprising point-form light sources are installed in the gun muzzles of the imitation guns 30, and CCD cameras are installed in appropriate locations on the periphery of the display part 11 (Japanese Patent Application No. 2002-36791). The discrimination of a plurality of imitation guns can be accomplished (for example) by varying the light emission timing of the respective markers or by varying the imaging timing of the CCD cameras.

(9) In short, the video game apparatus described as the invention comprising the embodiments shown in FIGS. 15 through 20 is a video game apparatus which displays game images on a monitor screen, and allows play by a plurality of players, this video game apparatus comprising position designating means for respectively designating desired positions on the abovementioned monitor screen in accordance with instructions from a plurality of locations, and enlarged image display means for producing enlarged images that correspond to enlarged images of images displayed within specified regions that include the abovementioned designated positions, and displaying the abovementioned enlarged images in specified regions, on the screen of said monitor, having a size which has been set in accordance with the mutual relationship of the abovementioned respective designated positions and/or the number of designated positions. In this case, in regard to the two embodiments shown in FIGS. 15 through 20, processing that alters the size of the scope marks according to the proximity of the designated positions to each other, and processing that alters the size of the scope marks according to the number of players, can be separately executed regardless of whether processing for cases of overlapping scope marks is included or not.

(10) Furthermore, in the abovementioned embodiments, the mutual relationships between positions were described as relative distances between positions. However, the mutual relationships between positions in the present invention are not limited to relative distances between positions. For example, even in cases where the distance relationships between positions designated at a certain timing and positions designated at a different timing are the same, it is conceivable that there may be instances in which information concerning the heights of the respective positions on the game image (i. e., the heights on the monitor screen) differs according to the timing, and instances in which the rates of positional variation over time (i. e., speeds of positional variation) of respective positions are different.

(11) Furthermore, the present applicant has recognized and described here an invention comprising a video game apparatus which encompasses an invention of a configuration devised so that respective enlarged images are displayed on the abovementioned monitor screen in accordance with the mutual relationships between positions, as well as the invention described in (9), and which displays game images on a game screen and allows play by a plurality of players, this video game apparatus comprising position designating means for respectively designating desired positions on the abovementioned monitor screen in accordance with instructions from a plurality of locations, and enlarged image display means for producing enlarged images that correspond to enlarged images of images displayed within specified regions that include the abovementioned designated positions, and displaying the abovementioned enlarged images in accordance with the mutual relationship of the abovementioned respective positions so that the abovementioned designated positions within the abovementioned monitor screen are included.

Summing up the present invention, a video game apparatus which displays game images on a monitor screen and allows play by a plurality of players, comprising position designating means for respectively designating desired positions on the abovementioned monitor screen in accordance with instructions from a plurality of locations, and enlarged corresponding image display means (or referred to as enlarged image display means) for producing enlarged images that correspond to enlarged images of images displayed within specified regions that include the abovementioned designated positions, and displaying the abovementioned enlarged images in accordance with the mutual relationship of the abovementioned respective positions so that the abovementioned designated positions within the abovementioned monitor screen are included.

Another form of the invention relates to a recording medium storing a program which is installed in a computer that is connected to a monitor and a plurality of operating input devices, and which is used to realize a game apparatus that displays game images on the screen of the abovementioned monitor, and that allows play by a plurality of players via the abovementioned operating input devices, wherein the abovementioned plurality of operating input devices are caused to function as position designating means that respectively designate desired positions on the abovementioned game images, and the abovementioned computer is caused to function as position detection means that detect the abovementioned positions designated by each of the abovementioned operating input devices, and as enlarged image display means that produce enlarged images corresponding to enlarged images of images in specified regions including the abovementioned positions detected by the abovementioned position detection means, and that display the abovementioned enlarged images in accordance with the mutual relationships of the abovementioned respective positions so that the abovementioned designated positions within the screen of the abovementioned monitor are included.

Furthermore, another form of the invention relates to an image processing method which displays game images on a monitor screen, comprising the steps of a position designating step in which instructions from a plurality of locations generated by the position indication means are received, and desired positions on the screen of the abovementioned monitor are respectively designated, and an enlarged image display step in which enlarged images corresponding to enlarged images of images displayed within specified regions that include the abovementioned positions instructed by the abovementioned position indication means are produced, and the abovementioned respective enlarged images are displayed in accordance with the mutual relationships between the abovementioned respective positions so that the abovementioned instructed positions within the abovementioned monitor screen are included.

In the abovementioned inventions, a game is played by two or more desired positions on the monitor screen being designated through the position designating means by a plurality of player or the like with respect to the game image that is displayed on the monitor screen. For each of the plurality of positions designated on the monitor screen, an enlarged image corresponding to an image that enlarges the image displayed within a specified region that includes this position is produced by the enlarged image display means. Furthermore, a judgment of the mutual relationships between the respective positions and the like are made. Then, enlarged corresponding images are displayed on the monitor screen in a configuration corresponding to the judged mutual relationships between positions. Specifically, enlarged images are displayed in a configuration that allows mutual influence on the basis of the mutual positional relationships of these images. As a result, a game can be provided in which the game operability is improved by the display of partial enlarged images such as scope displays or the like in a configuration that allows mutual influence for each of a plurality of players on the screen of the monitor on which the game images are displayed, and in which the feeling of pressure and the feeling of actual presence on the scene are high.

In the aforementioned video game apparatus, the abovementioned position designating means may include a plurality of position indication means that can be operated by players, and position detection means that respectively detect the abovementioned instructed positions. In this construction, the position designating means may have an integral configuration or a configuration in which the position indication part and position detection part are separate. Position designation is performed via the operations of the respective players by a plurality of position indication means, and the respective designated positions are detected by the position detection means.

In the aforementioned video game apparatus, the abovementioned position indication means includes light projecting means, and the abovementioned position detection means detect the positions of light reaching the abovementioned monitor screen from the abovementioned light projecting means and obtain the abovementioned positions as coordinates on the abovementioned monitor screen. In this construction, when the (e. g.) laser light reaches the monitor screen illuminated by the light projecting means, the position where the light arrives at the monitor screen is detected by the position detection means, and this position is obtained as coordinates on the monitor screen; in this way, the designated positions are determined.

In the aforementioned video game apparatus, an invention is proposed wherein indication is performed in respectively different configurations of the abovementioned position indication means, and these respectively different configurations are discriminated by the abovementioned position detection means. In this construction, since the indication of positions by the position indication means is performed in respectively different configurations, the respective designated positions can be discriminated and detected by the position detection means.

The aforementioned video game apparatus may further comprise display precedence setting means that set the display precedence for the display of the abovementioned respective enlarged images, and the abovementioned enlarged image display means display the abovementioned enlarge corresponding images by a display method suited to the abovementioned set display precedence in cases where the mutual relationship of the abovementioned respective positions is within a specified range. In this construction, in cases where the mutual relationships between designated positions are within a specified proximity range, the abovementioned respective enlarged images are displayed by a display method in accordance with the display precedence set by the display precedence setting means. Accordingly, even in cases where the designated positions are in close proximity to each other, the enlarged images are displayed by a display method in accordance with the display precedence; accordingly, confusion and uneasiness of the players are suppressed, so that obstacles to the progression of the game are reduced.

In the aforementioned video game apparatus, the abovementioned enlarged image display means sets frames of a size corresponding to the abovementioned display precedence on the abovementioned monitor screen, and display the abovementioned enlarged images within the abovementioned frames. In this construction, since the enlarged images are displayed inside frames, the size of the enlarged images is altered if the size of the frames varies according to the display precedence.

The abovementioned apparatus may comprise movement status monitoring means for monitoring the movement histories of the abovementioned positions, and the abovementioned display precedence setting means that respectively set the display precedence of the abovementioned enlarged images corresponding to the abovementioned positions on the basis of the monitored movement status of the abovementioned positions. In this construction, the display precedence is determined by whether or not the movement status of the designated position, e.g., the aim or the like, has been more or less determined.

In the aforementioned video game apparatus, the abovementioned display precedence setting means can be configured to apply weighting relating to the setting of the display precedence to the most recent movement history among the abovementioned monitored movement histories. In this construction, the display precedence is set with greater weight given to the movement status at more recent points in time than to older movement status (among the movement histories); as a result, the response characteristics of the movement history are heightened with respect to the setting of the display precedence.

The abovementioned apparatus may comprise play status evaluating means for evaluating the play status of the abovementioned players, and the abovementioned display precedence setting manes set the display precedence of the abovementioned enlarged images in accordance with the abovementioned evaluated play status. In this construction, the play status of the players, e.g., the score with respect to the game, is evaluated, and the display precedence is set in accordance with the results.

The apparatus may comprise game progression status judging means for judging the progression status of the abovementioned game, and the abovementioned display precedence setting means set the display precedence of the abovementioned enlarged images in accordance with the abovementioned judged progression status. In this construction, the display precedence is determined in accordance with the game progression status, e.g., the scenes and stages of the game, or the presence or absence of specified items.

In the aforementioned video game apparatus, may comprise player action detection means for detecting the actions of each player, and the abovementioned display precedence setting means set the display precedence of the abovementioned enlarged images in accordance with the abovementioned detected actions. In this construction, the display precedence is determined in accordance with the detected actions of the players.

In the aforementioned video game apparatus, the abovementioned enlarged image display means can be configured to display frames of a size corresponding to the mutual relationships of the abovementioned respective positions, and display the abovementioned enlarged images within the abovementioned frames. In this construction, the size of the frames used to display the enlarged images inside is determined in accordance with the mutual relationships of the respective positions.

In the aforementioned video game apparatus, the abovementioned enlarged image display means may be configured to preferentially display the abovementioned enlarged images which have a high display precedence with respect to the abovementioned overlapping portions when a plurality of the abovementioned enlarged images for which the abovementioned display precedence differs overlap with each other. In this construction, in cases where designate positions are in close proximity so that a plurality of enlarged images overlap, the respective enlarged images are displayed by a display method in accordance with the display precedence; accordingly, confusion and uneasiness of the players are suppressed, so that there is little interference with the progression of the game.

In the aforementioned video game apparatus, one of the abovementioned mutual relationships can be a proximity relationship between positions, and in cases where the mutual relationships between the abovementioned respective positions are within a first range, the abovementioned enlarged image display means display the abovementioned enlarged images in frames of a size corresponding to the mutual relationships of the abovementioned respective positions, while in cases where the mutual relationships between the abovementioned respective positions are in a second range in which the positions are closer than in the abovementioned first range, and the abovementioned enlarged images overlap with each other, the abovementioned enlarged image display means preferentially display the abovementioned enlarged images for which the abovementioned display precedence is high with respect to the abovementioned overlapping portions. In this construction, the enlarged images are recognized as the size of the frames in the first proximity range, and in cases where these images are in even closer proximity so that two enlarged images overlap, the enlarged image with a higher display precedence is preferentially displayed, so that an image that is preferentially easier to see is provided for the image with a higher display precedence.

In the aforementioned video game apparatus, the abovementioned enlarged image display means can be configured to display frames of a size corresponding to the number of the abovementioned players participating in the game, and display the abovementioned enlarged images within the abovementioned frames. In this construction, the size of the frames used to display the enlarged images is determined in accordance with the number of players participating in the game. Accordingly, the size of the scope frames can be varied in accordance with the number of players participating in the game and thus the rate at which scope images overlap with each other can be reduced.

This application is based on Japanese patent application serial no. 2002-204909, filed in Japan Patent Office on Jul. 12, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A video game apparatus which displays game images on a monitor screen and allows play by a plurality of players, said video game apparatus comprising:
   position designating means for respectively designating desired positions on said monitor screen in accordance with instructions from a plurality of locations of said players; and
   enlarged image display means for producing enlarged images corresponding to images displayed within specified regions, each of the specified regions includes each of said designated positions and for displaying said enlarged images including said designated positions in accordance with the mutual relationship of said respective positions.

2. The video game apparatus according to claim 1, wherein said position designating means includes a plurality of position indication means that can be operated by players, and position detection means for respectively detecting said instructed positions.

3. The video game apparatus according to claim 2, wherein said position indication means includes light projecting means, and said position detection means detects a position of a light reaching said monitor screen from said light projecting means and obtain said position as coordinates on said monitor screen.

4. The video game apparatus according to claim 1, further comprising display precedence setting means for setting the display precedence for the display of said respective enlarged images, and said enlarged image display means displays said enlarge images in a display mode which suits to said set display precedence in cases where the mutual relationship of said respective positions is within a specified range.

5. The video game apparatus according to claim 4, wherein said enlarged image display means sets a size of frames in accordance with said display precedence on said monitor screen, and display said enlarged images within said frames.

6. The video game apparatus according to claim 4, further comprising movement status monitoring means for monitoring the movement histories of said positions, and said display precedence setting means respectively sets the display precedence of said enlarged images corresponding to said positions on the basis of the monitored movement status of said positions.

7. The video game apparatus according to claim 6, wherein said display precedence setting means applies weighting relating to the setting of the display precedence to the most recent movement history among said monitored movement histories.

8. The video game apparatus according to claim 4, further comprising play status evaluating means for evaluating the play status of said players, and said display precedence setting means set the display precedence of said enlarged images in accordance with said evaluated play status.

9. The video game apparatus according to claim 4, further comprising game progression status judging means for judging the progression status of said game, and said display precedence setting means set the display precedence of said enlarged images in accordance with said judged progression status.

10. The video game apparatus according to claim 4, further comprising player action detection means for detecting the actions of each player, and said display precedence setting means set the display precedence of said enlarged images in accordance with said detected actions.

11. The video game apparatus according to claim 4, wherein said enlarged image display means displays frames having a size corresponding to the mutual relationships of said respective positions, and display said enlarged images within said frames.

12. The video game apparatus according to claim 4, wherein in cases where a plurality of said enlarged images for which said display precedence differs overlap with each other, said enlarged image display means preferentially displays said enlarged images which have a high display precedence with respect to said overlapping portions.

13. The video game apparatus according to claim 4, wherein said mutual relationships include proximity relationships between positions, and in cases where the mutual relationships between said respective positions are within a first range, said enlarged image display means displays said enlarged images in frames of a size corresponding to the mutual relationships of said respective positions, while in cases where the mutual relationships between said respective positions are in a second range in which the positions are closer than in said first range, and said enlarged images overlap with each other, said enlarged image display means preferentially displays said enlarged images for which said display precedence is high with respect to said overlapping portions.

14. The video game apparatus according to claim 1, wherein said enlarged image display means displays frames of a size corresponding to the number of said players participating in the game, and displays said enlarged images within said frames.

15. A recording medium which stores a program which is installed in a computer that is connected to a monitor and a plurality of operating input devices, and which is used to realize a game apparatus that displays game images on the screen of said monitor, and that allows play by a plurality of players via said operating input devices, wherein said plurality of operating input devices are caused to function as position designating means that respectively designate desired positions on said game images, and said computer is caused to function as position detection means that detect said positions designated by each of said operating input devices, and as enlarged image display means that produce enlarged images corresponding to enlarged images of images in specified regions including said positions detected by said position detection means, and that display said enlarged images in accordance with the mutual relationships of said respective positions so that said designated positions within the screen of said monitor are included.

16. An image processing method which displays game images on a monitor screen, the method comprising the steps of:
  receiving instructions from a plurality of locations generated by the position indication means;
  respectively designating desired positions on the screen of said monitor;
  producing enlarged images corresponding to images displayed within specified regions that include said positions instructed by said position indication means; and
  displaying said respective enlarged images in accordance with the mutual relationships between said respective positions so that said instructed positions within said monitor screen are included.

17. The video game apparatus according to claim 1, wherein said enlarged image display means changes display modes of said enlarged images in accordance with the mutual relationship of said respective positions.

* * * * *